United States Patent
Peddada et al.

(10) Patent No.: US 11,463,544 B1
(45) Date of Patent: Oct. 4, 2022

(54) ADMINISTRATION OF SERVICES EXECUTING IN CLOUD PLATFORM BASED DATACENTERS

(71) Applicant: salesforce.com, inc., San Francisco, CA (US)

(72) Inventors: Prasad Peddada, Alameda, CA (US); Sriram Shankarlal, Sammamish, WA (US); Giridharan Sridharan, Bellevue, WA (US); Nirav K. Butala, Fremont, CA (US)

(73) Assignee: Salesforce.com, Inc., San Francisco, CA (US)

( * ) Notice: Subject to any disclaimer, the term of this patent is extended or adjusted under 35 U.S.C. 154(b) by 0 days.

(21) Appl. No.: 17/537,240

(22) Filed: Nov. 29, 2021

(51) Int. Cl.
*H04L 67/51* (2022.01)
*H04L 67/10* (2022.01)

(52) U.S. Cl.
CPC .............. *H04L 67/51* (2022.05); *H04L 67/10* (2013.01)

(58) Field of Classification Search
CPC ................................ H04L 67/10; H04L 67/51
USPC ......................................................... 709/217
See application file for complete search history.

(56) References Cited

U.S. PATENT DOCUMENTS

| | | | | |
|---|---|---|---|---|
| 11,023,301 | B1 * | 6/2021 | Hornbeck | ................. G06F 8/63 |
| 2019/0245848 | A1 * | 8/2019 | Divoux | ............... H04L 63/0815 |
| 2021/0067468 | A1 * | 3/2021 | Cidon | ................ H04L 41/0813 |

FOREIGN PATENT DOCUMENTS

CN 112748985 A * 5/2021

OTHER PUBLICATIONS

Google English Machine Translation of CN112748985A, captured May 6, 2022 (12 pages) (Year: 2022).*
Coursera, "Bloom Filters and Analysis," Date Unknown, pp. 1-8, [Online] [Retrieved on Jan. 12, 2022] Retrieved from the Internet <URL: https://www.coursera.org/lecture/algorithms-searching-sorting-indexing/bloom-filters-and-analysis-MCKmi>.
Docker, "Use containers to Build, Share and Run your applications," Jun. 2, 2021, pp. 1-6, [Online] [Retrieved on Jan. 12, 2022] Retrieved from the Wayback Machine <URL: http://web.archive.org/web/20210602083650/https://www.docker.com/resources/what-container>.

(Continued)

*Primary Examiner* — Wing F Chan
*Assistant Examiner* — Leon Y Tseng
(74) *Attorney, Agent, or Firm* — Fenwick & West LLP

(57) ABSTRACT

A cloud infrastructure is configured and deployed for managing services executed on a cloud platform. The cloud infrastructure includes a control datacenter configured to communicate with one or more service datacenters. The service datacenter deploys one or more application programming interfaces (API's) associated with a service. The service datacenter also deploys an administration agent. The control datacenter hosts an engine that receives requests from users to perform administration operations by invoking the administration API's. In this manner, the control datacenter functions as a centralized control mechanism that effectively distributes administration operation requests as they are received from users to service datacenters that can service the requests. The cloud infrastructure provides an auditable, compliant and secure management system for administering services for distributed systems running in the cloud.

28 Claims, 18 Drawing Sheets

(56) References Cited

OTHER PUBLICATIONS salesforce.com, "Introducing Lightning Web Components," Summer 2021, pp. 1-2, [Online] [Retrieved on Jan. 12, 2022] Retrieved from the Internet <URL: https://developer.salesforce.com/docs/component-library/documentation/en/52.0/lwc/lwc.get_started_introductions>.

Swagger, "API Documentation," Oct. 19, 2021, pp. 1-4, [Online] [Retrieved on Jan. 12, 2022] Retrieved from the Wayback Machine <URL: http://web.archive.org/web/20211019055958/https://swagger.io/solutions/api-documentation/>.

Wikipedia, "Swagger (Software)," Last Edited Jan. 10, 2021, pp. 1-3, [Online] [Retrieved on Jan. 12, 2022] Retrieved from the Wayback Machine <URL: http://web.archive.org/web/20210817230307/https://en.wikipedia.org/wiki/Swagger_(software)>.

\* cited by examiner

```yaml
servers:
  - url: http://kitten.rescue.store/v1
paths:
  /list:
    get:
      summary: List all kittens available for adoption
      operationId: listKittens
      tags:
        - kittens
      parameters:
        - name: limit
          in: query
          description: How many kittens to return (max 100)
          required: false
          schema:
            type: integer
            format: int32
        - name: location
          in: query
          description: Location of store branch
          required: false
          schema:
            type: string
            enum:
              - San Jose
              - San Francisco
              . . .

responses:
        '200':
          description: An array of kittens
          content:
            application/json:
              schema:
                $ref: "#/components/schemas/Kittens"
components:
  schemas:
    Kitten:
      type: object
      required:
        - id
        - name
        - breed
      properties:
        id:
          type: integer
          format: int64
        name:
          type: string
        breed:
          type: string
```

ADMINISTRATION OF SERVICES EXECUTING IN CLOUD PLATFORM BASED DATACENTERS

BACKGROUND

Field of Art

This disclosure relates in cloud computing platforms, and in particular to management of administration tasks of services executing in data centers configured in cloud computing platforms.

Description of the Related Art

Organizations are increasingly relying on cloud platforms (or cloud computing platforms) such as AWS (AMAZON WEB SERVICES), GOOGLE cloud platform, MICROSOFT AZURE, and so on for their infrastructure needs. Cloud platforms provide servers, storage, databases, networking, software, and so on over the internet to organizations. Conventionally, organizations maintained data centers that house hardware and software used by the organization. However, maintaining data centers can result in significant overhead in terms of maintenance, personnel, and so on. As a result, organizations are shifting their data centers to cloud platforms that provide scalability and elasticity of computing resources. Organizations maintain cloud infrastructure on cloud platforms using continuous delivery platforms that can manage and deploy applications on cloud platforms.

A large system such as a multi-tenant systems may manage services for a large number of organizations representing tenants of the multi-tenant system and may interact with multiple cloud platforms. A multi-tenant system may have to maintain several thousand such data centers on a cloud platform. Each datacenter may execute different services. The services executed on the cloud platform support various administration operations, for example, configuration of storage for applications, configuration of network resources, cache management, access control management and so on. If a malicious actor manages to perform the administration tasks of the services, the malicious actor may be able to cause significant damage to the system since the administration tasks have significant impact on the system and allow users to exercise significant control over the system.

BRIEF DESCRIPTION OF DRAWINGS

FIG. 8 illustrates an example API specification describing an administration operation for a pet store online service according to an embodiment.

Figure 1:
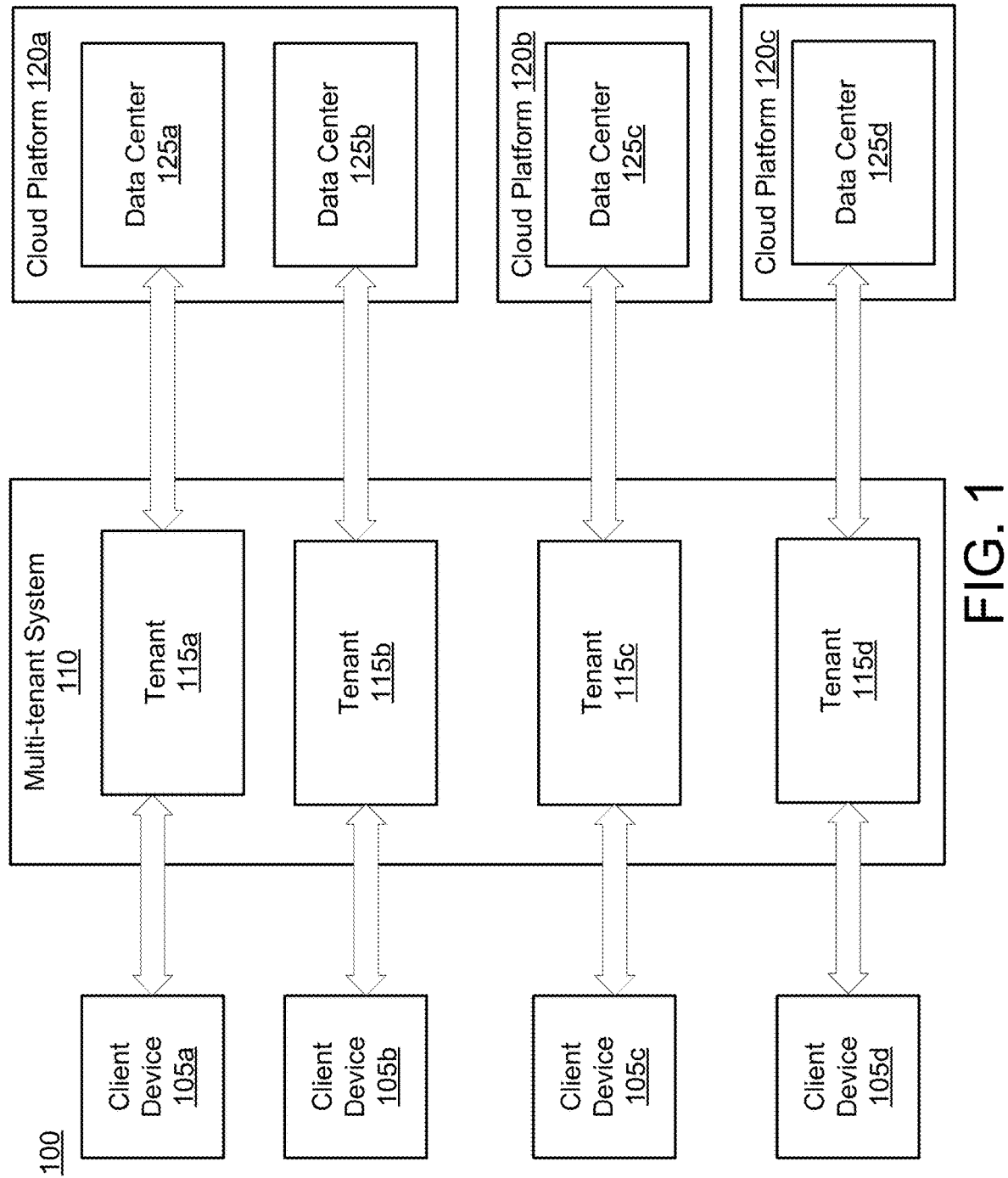
FIG. 1 is a block diagram of a system environment illustrating a multi-tenant system configuring data centers on cloud platforms according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

Cloud platforms provide computing resources, such as storage, computing resources, applications, and so on to computing systems on an on-demand basis via a public network such as internet. Cloud platforms allow enterprises to minimize upfront costs to set up computing infrastructure and also allow enterprises to get applications up and running faster with less maintenance overhead. Cloud platforms also allow enterprises to adjust computing resources to rapidly fluctuating and unpredictable demands. Enterprises can create a data center using a cloud platform for use by users of the enterprise. However, implementing a data center on each cloud platform requires expertise in the technology of the cloud platform.

Embodiments create data centers in a cloud platform using a cloud platform infrastructure language that is cloud platform independent. The system receives a cloud platform independent declarative specification of a data center. The declarative specification describes the structure of the data center and may not provide instructions specifying how to create the data center. The cloud platform independent declarative specification is configured to generate the data center on any of a plurality of cloud platforms and is specified using a cloud platform infrastructure language. The system receives information identifying a target cloud platform for creating the data center and compiles the cloud platform independent declarative specification to generate a cloud platform specific data center representation. The system sends the cloud platform specific data center representation and a set of instructions for execution on the target cloud platform. The target cloud platform executes the instructions to configure the data center using the platform specific data center representation. The system provides users with access to the computing resources of the data center configured by the cloud platform.

In one embodiment, the system performs operations related to software releases on datacenters configured on a cloud platform, for example, deploying software releases, provisioning resources, performing rollback of software releases, and so on. The system accesses a data center configured on a target cloud platform. The datacenter is generated based on a cloud platform independent declarative specification comprising a hierarchy of data center entities. Each data center entity comprises one or more of (1) a service or (2) one or more other data center entities. The system generates a cloud platform independent master pipeline that comprises: (1) a sequence of stages for deployment of a software artifact, for example, a development stage, a test stage, and a production stage, and (2) criteria for promoting the software artifact from one stage to a subsequent stage of the sequence of stages. The system compiles the cloud platform independent master pipeline to generate a cloud platform dependent detailed pipeline for the target cloud platform with instructions for performing operations related to services according to the layout of datacenter defined by the declarative specification. The system executes the cloud platform dependent detailed pipeline on the target cloud platform, for example, to deploy software releases on datacenter entities of the datacenter.

In one embodiment, the system accesses the data center configured on a target cloud platform. The system receives a cloud platform independent artifact version map associating data center entities of the data center with versions of software artifacts targeted for deployment on the datacenter entities. Each software artifact comprises executable instructions associated with a service configured for execution on one or more cloud platforms. The system generates a cloud platform specific master pipeline for the target cloud platform based on the cloud platform independent artifact version map. The cloud platform specific master pipeline comprises instructions to perform operations such as build and deploy appropriate versions of deployment artifacts for services on data center entities in accordance with the cloud platform independent version map. The system transmits the cloud platform specific deployment pipeline to the target cloud platform for execution. The artifact version map and the master pipelines can be used to perform various actions related to services including deployment of service, destroying services, provisioning resources for services, destroying resources for services, and so on.

A cloud platform is also referred to herein as a substrate. The declarative specification of data center is substrate independent or substrate agnostic. If operations related to a datacenter such as deployment of software releases, provisioning of resources, and so on are performed using conventional techniques, the user has to provide cloud platform specific instructions. Accordingly, the user needs expertise of the cloud platform being used. Furthermore, the instructions are cloud platform specific and are not portable across multiple platforms. For example, the instructions for deploying software on an AWS cloud platform are different from instructions on a GCP cloud platform. A developer needs to understand the details of how each feature is implemented on that specific cloud platform. The system disclosed provides a cloud platform infrastructure language that allows users to perform operations on datacenters using instructions that are cloud platform independent and can be executed on any cloud platform selected from a plurality of cloud platforms. A compiler of the cloud platform infrastructure language generates a cloud platform specific detailed instructions for a target cloud platform.

The cloud platform infrastructure language may be referred to as a domain specific language (DSL). The system may represent a multi-tenant system but is not limited to multi-tenant systems and can be any online system or any computing system with network access to the cloud platform.

System Environment

FIG. 1 is a block diagram of a system environment illustrating a multi-tenant system configuring data centers on cloud platforms according to an embodiment. The system environment 100 comprises a multi-tenant system 110, one or more cloud platforms 120, and one or more client devices 105. In other embodiments, the system environment 100 may include more or fewer components.

The multi-tenant system 110 stores information of one or more tenants 115. Each tenant may be associated with an enterprise that represents a customer of the multi-tenant system 110. Each tenant may have multiple users that interact with the multi-tenant system via client devices 105.

A cloud platform may also be referred to as a cloud computing platform or a public cloud environment. A tenant may use the cloud platform infrastructure language to provide a declarative specification of a datacenter that is created on a target cloud platform 120 and to perform operations using the datacenter, for example, provision resources, perform software releases and so on. A tenant 115 may create one or more data centers on a cloud platform 120. A data center represents a set of computing resources including servers, applications, storage, memory, and so on that can be used by users, for example, users associated with the tenant. Each tenant may offer different functionality to users of the tenant. Accordingly, each tenant may execute different services on the datacenter configured for the tenant. The multi-tenant system may implement different mechanisms for release and deployment of software for each tenant. A tenant may further obtain or develop versions of software that include instructions for various services executing in a datacenter. Embodiments allow the tenant to deploy specific versions of software releases for different services running on different computing resources of the datacenter.

The computing resources of a data center are secure and may not be accessed by users that are not authorized to access them. For example, a data center 125a that is created for users of tenant 115a may not be accessed by users of tenant 115b unless access is explicitly granted. Similarly, data center 125b that is created for users of tenant 115b may not be accessed by users of tenant 115a, unless access is explicitly granted. Furthermore, services provided by a data center may be accessed by computing systems outside the data center, only if access is granted to the computing systems in accordance with the declarative specification of the data center.

With the multi-tenant system 110, data for multiple tenants may be stored in the same physical database. However, the database is configured so that data of one tenant is kept logically separate from that of other tenants so that one tenant does not have access to another tenant's data, unless such data is expressly shared. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system 110 may execute an application server that simultaneously processes requests for a number of tenants. However, the multi-tenant system enforces tenant-level data isolation to ensure that jobs of one tenant do not access data of other tenants.

Examples of cloud platforms include AWS (AMAZON web services), GOOGLE cloud platform, or MICROSOFT AZURE. A cloud platform 120 offers computing infrastructure services that may be used on demand by a tenant 115 or by any computing system external to the cloud platform 120. Examples of the computing infrastructure services offered by a cloud platform include servers, storage, databases, networking, security, load balancing, software, analytics, intelligence, and other infrastructure service functionalities. These infrastructure services may be used by a tenant 115 to build, deploy, and manage applications in a scalable and secure manner.

The multi-tenant system 110 may include a tenant data store that stores data for various tenants of the multi-tenant store. The tenant data store may store data for different tenants in separate physical structures, for example, separate database tables or separate databases. Alternatively, the tenant data store may store data of multiple tenants in a shared structure. For example, user accounts for all tenants may share the same database table. However, the multi-tenant system stores additional information to logically separate data of different tenants.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

Although the techniques disclosed herein are described in the context of a multi-tenant system, the techniques can be implemented using other systems that may not be multi-tenant systems. For example, an online system used by a single organization or enterprise may use the techniques disclosed herein to create one or more data centers on one or more cloud platforms 120.

System Architecture

The multi-tenant system 110 includes a deployment module for deploying software artifacts on the cloud platforms.

Figure 2A:
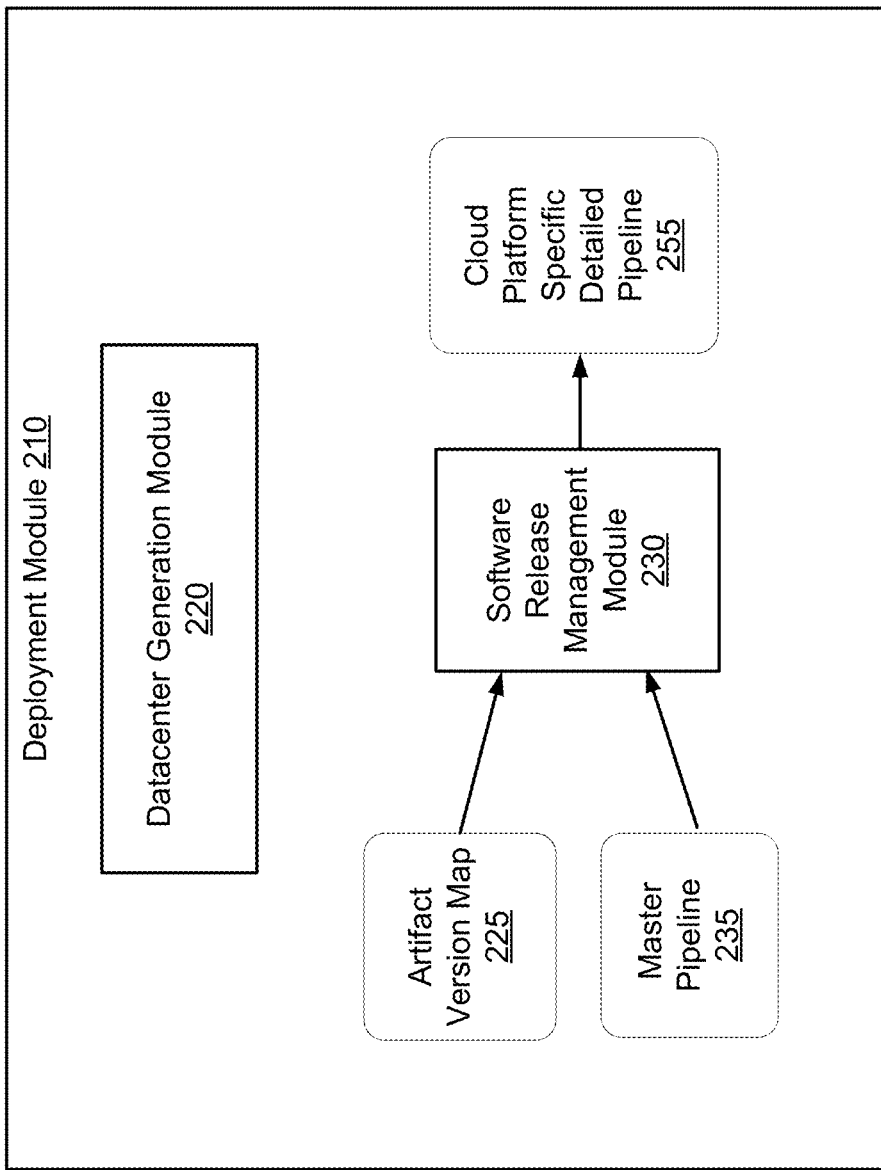
FIG. 2A is a block diagram illustrating the system architecture of a deployment module 210 according to an embodiment.

The deployment module can perform various operations associated with software releases, for example, provisioning resources on a cloud platform, deploying software releases, performing rollbacks of software artifacts installed on datacenter entities, and so on. FIG. 2 is a block diagram illustrating the system architecture of a deployment module 210 according to an embodiment. The deployment module 210 includes a data center generation module 220 and a software release management module 230. Other embodiments can have different and/or other components than the ones described here, and that the functionalities can be distributed among the components in a different manner.

The data center generation module 220 includes instructions for creating datacenters on the cloud platform. The software release management module 230 includes instructions for deploying software releases for various services or applications running on the datacenters created by the data center generation module 220.

Figure 4:
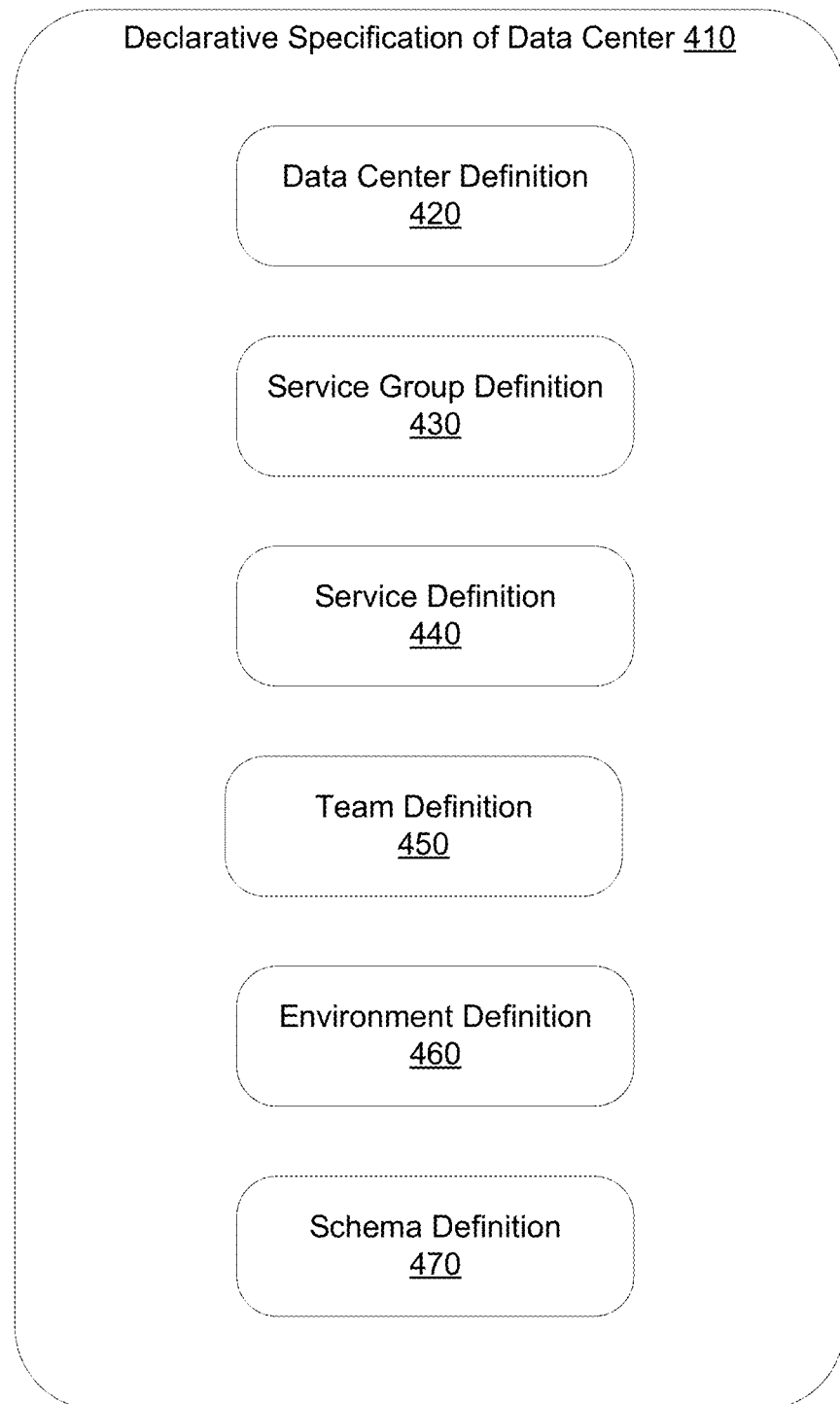
FIG. 4 illustrates an example of a data center declarative specification according to one embodiment.

The data center generation module 220 receives from users, for example, users of a tenant, a cloud platform independent declarative specification of a data center. The cloud platform independent declarative specification of a data center specifies various entities of the data center. In an embodiment, the cloud platform independent declarative specification of a data center comprises a hierarchical organization of datacenter entities, where each datacenter entity may comprise one or more services, one or more other datacenter entities or a combination of both. FIG. 4 describes various types of datacenter entities in further detail. The data center generation module 220 receives the platform independent declarative specification and a target cloud platform as input and generates a cloud platform specific metadata representation for the target cloud platform. The data center generation module 220 deploys the generated cloud platform specific metadata representation on the target cloud platform to create a data center on the target cloud platform according to the declarative specification.

The software release management module 230 receives as inputs (1) an artifact version map 225 and (2) a master pipeline 235. The artifact version map 225 identifies specific versions of software releases or deployment artifacts that are targeted for deployment on specific datacenter entities. The artifact version map 225 maps datacenter entities to software release versions that are targeted to be deployed on the datacenter entities. The master pipeline 235 includes instructions for operations related to software releases on the datacenter, for example, deployment of services, destroying services, provisioning resources for services, destroying resources for services, and so on.

The master pipeline 235 may include instructions for performing operations related to software releases for different environments such as development environment, test environment, canary environment, and production environment, and instructions for determining when a software release is promoted from one environment to another environment. For example, if the deployments of a software release in a development environment execute more than a threshold number of test cases, the software release is promoted for test environment for further testing, for example, system level and integration testing. If the software release in a test environment passes a threshold of test coverage, the software release is promoted to canary environment where the software release is provided to a small subset of users on a trial basis. If the software release in a canary environment executes without errors for a threshold time, the software release is promoted to production environment where the software release is provided to all users.

The software release management module 230 compiles the input artifact version map 225 and the master pipeline 235 to generate a cloud platform specific detailed pipeline 255 that is transmitted to the target cloud platform. The cloud platform specific detailed pipeline 255 includes instructions for deploying the appropriate version of a software release or deployment artifact on the datacenter entities as specified in the artifact version map 225. The software release management module 230 may receive modifications to one of the inputs. For example, a user may modify the input artifact version map 225 and provide the same master pipeline 235. Accordingly, the same master pipeline is being used but different software releases are being deployed on datacenter entities. The software release management module 230 recompiles the inputs to generate a new cloud platform specific detailed pipeline 255 that deploys the versions of software releases according to the new artifact version map 225.

The artifact version map may also be referred to as a deployment manifest, a version manifest, a software release map, or a software artifact version map. The master pipeline may also be referred to as a master deployment pipeline or a master orchestration pipeline.

Figure 2B:
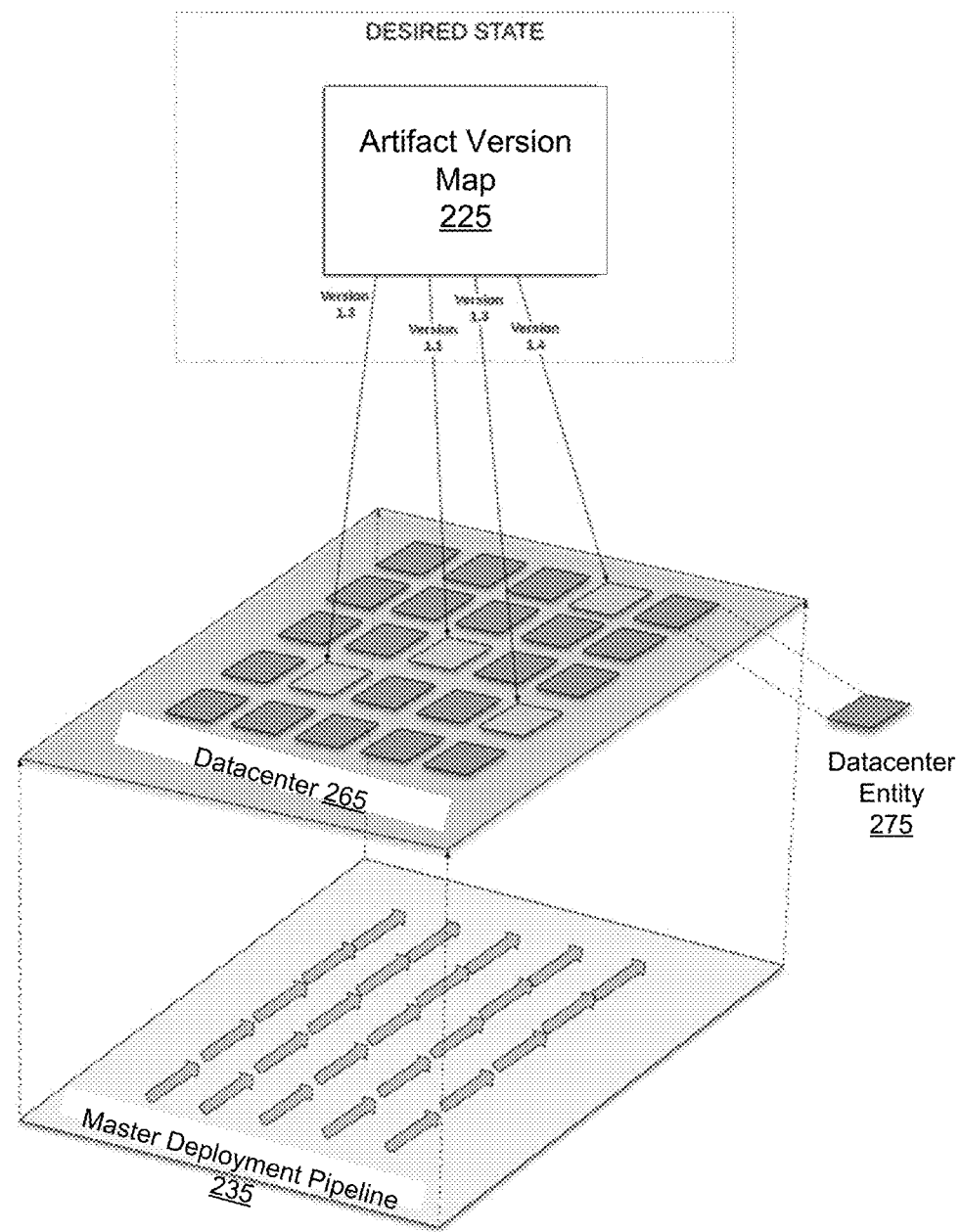
FIG. 2B illustrates the overall process for deploying software artifacts in a datacenter according to an embodiment.

FIG. 2B illustrates the overall process for deploying software artifacts in a datacenter according to an embodiment. FIG. 2B shows a layout of a datacenter 265 including various datacenter entities. As shown in FIG. 2B, the artifact version map 225 identifies the different versions of software that are targeted for release on different datacenter entities 275 of the datacenter 265. The master pipeline represents the flow of deployment artifacts through the various environments of the datacenter. The software release management module 230 combines the information in the master pipeline 235 with the artifact version map 225 to determine cloud platform specific detailed pipeline 255 that maps the appropriate version of software artifacts on the datacenter entities according to the artifact version map 225.

Figure 3:
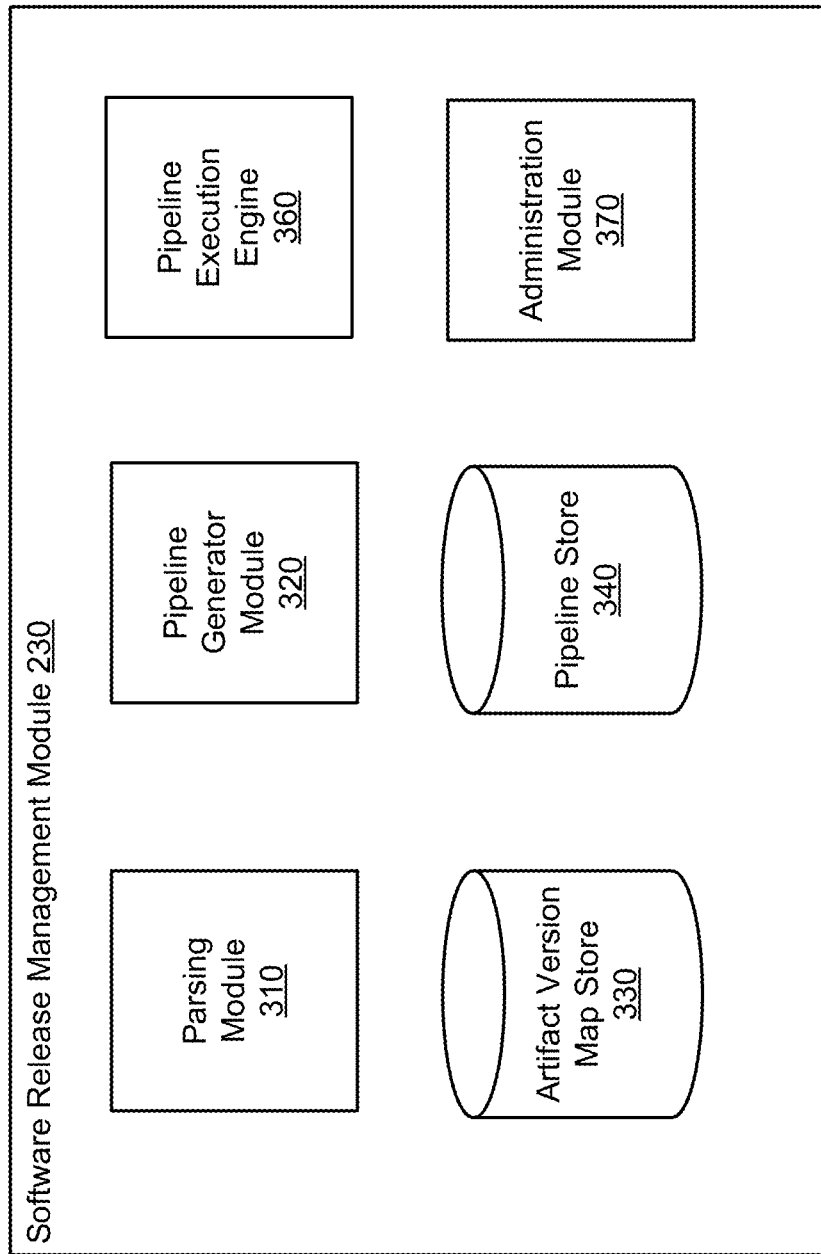
FIG. 3 is a block diagram illustrating the architecture of a software release management module according to one embodiment.

FIG. 3 is a block diagram illustrating the architecture of a software release management module 230 according to one embodiment. The software release management module 230 includes a parsing module 310, a pipeline generator module 320, an artifact version map store 330, a pipeline store 340, a pipeline execution engine 360, and an administration module 370. Other embodiments may include more, fewer, or different modules than those indicated herein in FIG. 3.

The parsing module 310 parses various types of user input including declarative specification of a data center, artifact version map 225, and master pipelines 235. The parsing module 310 generates data structures and metadata representations of the input processed and provides the generated data structures and metadata representations to other modules of the software release management module 230 for further processing.

The metadata store 340 stores various transformed metadata representations of data centers that are generated by the software release management module 230. The transformed metadata representations may be used for performing rollback to a previous version if an issue is encountered in a current version of the data center. The transformed metadata representations may be used for validation, auditing, governance, and so on at various stages of the transformation process.

The pipeline generator module 320 processes the master pipelines in conjunction with the artifact version map received as input to generate a detailed pipeline for a target cloud platform. The pipelines comprise stages that include instructions for provisioning services or deploying applications for deploying versions of software releases for various services on the cloud platform according to the artifact version map. The artifact version map store 330 stores artifact version maps received from users and the pipeline store 340 stores master pipelines as well as pipelines generated by the pipeline generator module 320.

The pipeline execution engine 360 executes the detailed pipelines generated by the pipeline generator module 320. In an embodiment, the pipeline execution engine 360 is a system such as SPINNAKER that executes pipelines for releasing/deploying software. The pipeline execution engine 360 parses the pipelines and executes each stage of the pipeline on a target cloud computing platform.

The administration module 370 manages administration operations by various services. The services executing on the cloud platform typically provide administration APIs (application programming interfaces). An administration API performs an administration operation. For example, an administration API may allow a user, for example, a system administrator or a system process to perform an administration task such as clearing cache, modifying storage configuration for an application, granting access to specific users, and so on. The administration module 370 facilitates the management of such administration operations for services across various datacenters configured on a cloud platform.

Cloud Platform-Based Data Center Generation

FIG. 4 illustrates an example of a declarative specification of a data center according to one embodiment. The declarative specification 410 includes multiple data center entities. A data center entity is an instance of a data center entity type and there can be multiple instances of each data center entity type. Examples of data center entities include data centers, service groups, services, teams, environments, and schemas.

The declarative specification 410 includes definitions of various types of data center entities including service group, service, team, environment, and schema. The declarative specification includes one or more instances of data centers. Following is a description of various types of data center entities and their examples. The examples are illustrative and show some of the attributes of the data center entities. Other embodiments may include different attributes and an attribute with the same functionality may be given a different name than that indicated herein. In an embodiment, the declarative specification is specified using hierarchical objects, for example, JSON (Javascript object notation) that conform to a predefined schema.

A service group 520 represents a set of capabilities and features and services offered by one or more computing systems that can be built and delivered independently, in accordance with one embodiment. A service group may be also referred to as a logical service group, a functional unit, or a bounded context. A service group 520 may also be viewed as a set of services of a set of cohesive technical use-case functionalities offered by one or more computing systems. A service group 520 enforces security boundaries. A service group 520 defines a scope for modifications. Thus, any modifications to an entity, such as a capability, feature, or service offered by one or more computing systems within a service group 520 may propagate as needed or suitable to entities within the service group, but does not propagate to an entity residing outside the bounded definition of the service group 520. A data center may include multiple service groups 520. A service group definition specifies attributes including a name, description, an identifier, schema version, and a set of service instances. An example of a service group is a blockchain service group that includes a set of services used to providing blockchain functionality. Similarly, a security service group provides security features. A user interface service group provides functionality of specific user interface features. A shared document service group provides functionality of sharing documents across users. Similarly, there can be several other service groups.

Service groups support reusability of specification so that tenants or users interested in developing a data center have a library of service groups that they can readily use. The boundaries around services of a service groups are based on security concerns and network concerns among others. A service group is associated with protocols for performing interactions with the service group. In an embodiment, a service group provides a collection of APIs (application programming interfaces) and services that implement those APIs. Furthermore, service groups are substrate independent. A service group provides a blast radius scope for the services within the service group so that any failure of a service within the service group has impact limited to services within the service group and has minimal impact outside the service group.

Following is an example of a specification of a service group. The service group specifies various attributes representing metadata of the service group and includes a set of services within the service group. There may be other types of metadata specified for a service group, not indicated herein.

```
{
  "service_group": [
    {
      "cells": [ ],
      "description": "Service group Service Instance
      Definitions",
      "service_group_id": "id1",
      "name": "name1",
      "schema_version": "1.0",
      "cluster_instances": [
        {
          "cluster_instance_name:" "cluster1",
          "cluster_type": "cluster_type1"
        },
        {
          "cluster_instance_name": "cluster2",
          "cluster_type": "cluster_type1"
        },
        {
          "cluster_instance_name": "cluster3",
          "cluster_type": "cluster_type2"
        }
      ],
      "service_instances": [
        {
          "service_instance_name": "serviceinstance0001",
          "service_type": "servicetype1"
        },
        {
          "service_instance_name": "serviceinstance0002",
          "service_type": "servicetype1"
          "cluster_instance": "cluster1"
        },
        {
          "service_instance_name": "serviceinstance0003",
          "service_type": "servicetype2"
        },
        ...
      ],
      "service_teams": ["team1"],
      "type": "servicetype"
```

-continued

```
      "security_groups":[
        {
          "name":"group1",
          "policies":[
            {
              "description":"Allow access from site S1",
              "destination":{ "groups":[ "group2" ] },
              "environments":[ "dev", "test", "staging" ],
              "source":{
                "iplist":"URL1",
                "filters":[ filter-expression ]
              }
            }
          ]
        }
      ]
    }
  ]
}
```

As shown in the example above, a service group may specify a set of clusters. A cluster represents a set of computing nodes, for example, a set of servers, a set of virtual machines, or a set of containers (such as KUBERNETES containers). A physical server may run multiple containers, where each container has its own share of filesystem, CPU, memory, process space, and so on.

The service group specifies a set of services. A service group may specify a cluster for a service so that the data center deployed on a cloud platform runs clusters of computing nodes and maps the services to clusters based on the specified mapping if included in the declarative specification. For example, in the service group example shown above, the service instance serviceinstance0002 is specified to run on cluster instance cluster1.

The service group may specify security groups, each security group specifying a set of services that are allowed to interact with each other. Services outside the security group are required to pass additional authentication to communicate with services within the security group. Alternatively, the services within a security group use one protocol to interact with each other and services outside the security group use a different protocol that requires enhances authentication to interact with services within the security group. Accordingly, a security group specifies policies that determine how services can interact with each other. A security policy may specify one or more environments for which the security policy is applicable. For example, a security policy policy1 may apply to a particular environment env1 (e.g., production environment) and another security policy policy2 may apply to another environment env2 (e.g., development environment). A security policy may be specified for a service group type or for a specific service type.

In an embodiment, the security policy specifies expressions for filtering the service groups based on various attributes so that the security policy is applicable to the filtered set of service groups. For example, the security policy may specify a list of IP (internet protocol) addresses that are white listed for a set of service groups identified by the filtered set and accordingly these computing systems are allowed access to the service group or to specific set of services within the service group.

In an embodiment, a security policy may specify for a service group, a set of source services and a set of destination services. The source services for a particular service specify the services outside the security group that are allowed to connect with this particular service. The destination services for a particular service specify the services outside the security group that this particular service needs to connect to. During provisioning and deployment, the data center generation module generates instructions for the cloud platform that implement specific network policies using cloud platform specific features and network functionality such that the network policies implement the security policies specified in the declarative specification.

A data center entity called a cell represents a set of services that interact with each other in a vertical fashion and can be scaled by additional instances or copies of the cell, i.e., copies of the set of services. Creating multiple instances of a cell allows a system to scale a set of services that interact with each other. A data center instance may include one or more cells. Each cell may include one or more services. A data center may include instances of service groups or cells.

A service definition specifies metadata for a type of service, for example, database service, load balancer service, and so on. The metadata be describe various attributes of a service including a name of the service, description of the service, location of documentation for the service, any sub-services associated with the service, an owner for the service, a team associated with the service, build dependencies for the service specifying other services on which this service depends at build time, start dependencies of the service specifying the other services that should be running when this particular service is started, authorized clients, DNS (domain name server) name associated with the service, a service status, a support level for the service, and so on. The service definition specifies a listening ports attribute specifying the ports that the service can listen on for different communication protocols, for example, the service may listen on a port p1 for UDP protocol and a port p2 for TCP protocol. Other services within the data center can interact with a service via the ports specified by the service.

The service definition specifies an attribute outbound access that specifies destination endpoints, for example, external URLs (uniform resource locators) specifying that the service needs access to the specified external URLs. During deployment, the data center generation module ensures that the cloud platform implements access policies such that instances of this service type are provided with the requested access to the external URLs.

The outbound access specification may identify one or more environment types for the service for which the outbound access is applicable. For example, an outbound access for a set of endpoints S1 may apply to a particular environment env1 (e.g., production environment) and outbound access for a set of endpoints S2 may apply to another environment env2 (e.g., development environment).

Following is an example of a service definition.

```
{
    "service_definition": [
        {
            "authorized_clients": [ ],
            "build_dependencies": [ ],
            "description": "description of service",
            "dns_name": "dns1",
            "documentation": "URL",
            "name": "name1",
            "namespace": "space1",
            "service_owner": "user1",
            "service_status": "GA",
            "service_team": "team1",
            "support_level": "STANDARD",
            "start_dependencies": ["svc5", "svc7", . . . ],
            "sub_services": [ "service1", " service2", " service3", . . . ],
```

-continued

```
            "listening_ports":[
                { "protocol":"tcp", "ports":[ "53" ] },
                { "protocol":"udp","ports":[ "53" ] }
            "outbound_access":[
                {
                    "destination":[
                        {
                            "endpoints":[ ".xyz.com:443", ".pqr.com:443" ]
                        }
                    ]
                }
            ],
        }
    ]
}
```

A team definition 450 includes team member names and other attributes of a team for example, name, email, communication channel and so on. Following is an example of a team definition. A service may be associated with one or more teams that are responsible to modifications made to that service. Accordingly, any modification made to that service is approved by the team. A service may be associated with a team responsible for maintenance of the service after it is deployed in a cloud platform. A team may be associated with a service group and is correspondingly associated with all services of that service group. For example, the team approves any changes to the service group, for example, services that are part of the service group. A team may be associated with a data center and is accordingly associated with all service groups within the data center. A team association specified at a data center level provides a default team for all the service groups within the data center and further provides a default team for all services within the service groups.

According to an embodiment, a team association specified at the functional level overrides the team association provided at the data center level. Similarly, a team association specified at the service level overrides the default that may have been provided by a team association specified at the service group level or a data center level. A team can decide how certain action is taken for the data center entity associated with the team. The team associations also determine the number of accounts on the cloud platform that are created for generating the final metadata representation of the data center for a cloud platform by the compiler and for provisioning and deploying the data center on a cloud platform. The data center generation module 210 creates one or more user accounts in the cloud platform and provides access to the team members to the user accounts. Accordingly, the team members are allowed to perform specific actions associated with the data center entity associated with the team, for example, making or approving structural changes to the data center entity or maintenance of the data center entity when it is deployed including debugging and testing issues that may be identified for the data center entity.

Conventional techniques associate the same team with the data center through out the design process thereby resulting in the organizational structure having an impact on the design of the data center or service group. Embodiments decouple the team definition from the constructions that define the data center entity, thereby reducing the impact of the teams on the design and architecture of the data center entity.

```
{
    "team_definition": [
        {
```

```
"name": "team1",
"description": "description of team",
"admins": [
    "user1",
    "user2",
    "user3",
    "user4",
    . . .
],
"team_id": "id1",
"owner": "owner_id",
"email": "team1@xyz.com",
}
],
"communication_channel": "channel1"
"schema_version": "1.0"
}
```

An environment definition 460 specifies a type of system environment represented by the data center, for example, development environment, staging environment, test environment, or production environment. A schema definition 470 specifies schema that specifies syntax of specific data center entity definitions. The schema definition 470 is used for validating various data center entity definitions. The data center generation module determines security policies for the data center in the cloud platform specific metadata representation based on the environment. For example, a particular set of security policies may be applicable for an environment env1 and a different set of security policies may be applicable for environment env2. For example, the security policies provide much more restricted access in production environment as compared to development environment. The security policy may specify the length of time that a security token is allowed to exist for specific purposes. For example, long access tokens (e.g., week long access tokens) may be allowed in development environment but access tokens with much smaller life time (e.g., few hours) used in production environment. Access tokens may allow users or services with access to specific cloud platform resources.

A data center definition 420 specifies the attributes and components of a data center instance. A declarative specification may specify multiple data center instances. The data center definition 420 specifies attributes including a name, description, a type of environment, a set of service groups, teams, domain name servers for the data center, and so on. A data center definition may specify a schema definition and any metadata representation generated from the data center definition is validated against the specified schema definition. A data center includes a set of core services and capabilities that enable other services to function within the data center. An instance of a data center is deployed in a particular cloud platform and may be associated with a particular environment type, for example, development, testing, staging, production, and so on.

Following is a definition of a data center instance. The data center instance definition includes a list of service groups included in the data center instance and other attributes including an environment of the data center, a data center identifier, a name, a region representing a geographical region, one or more teams associated with the data center, and a schema version.

```
{
"datacenter_instance":{
    "environment": "env1",
    "datacenter_instance_identifier": "id1",
    "name": "data center1",
    "region": "region1",
    "service_groups": [
        "service_group1",
        "service_group2",
        "service_group3",
        "service_group4",
        . . .
    ],
    "schema_version": "1.0",
    "admin_team":"admins",
    . . .
}
}
}
}
```

Figure 5:
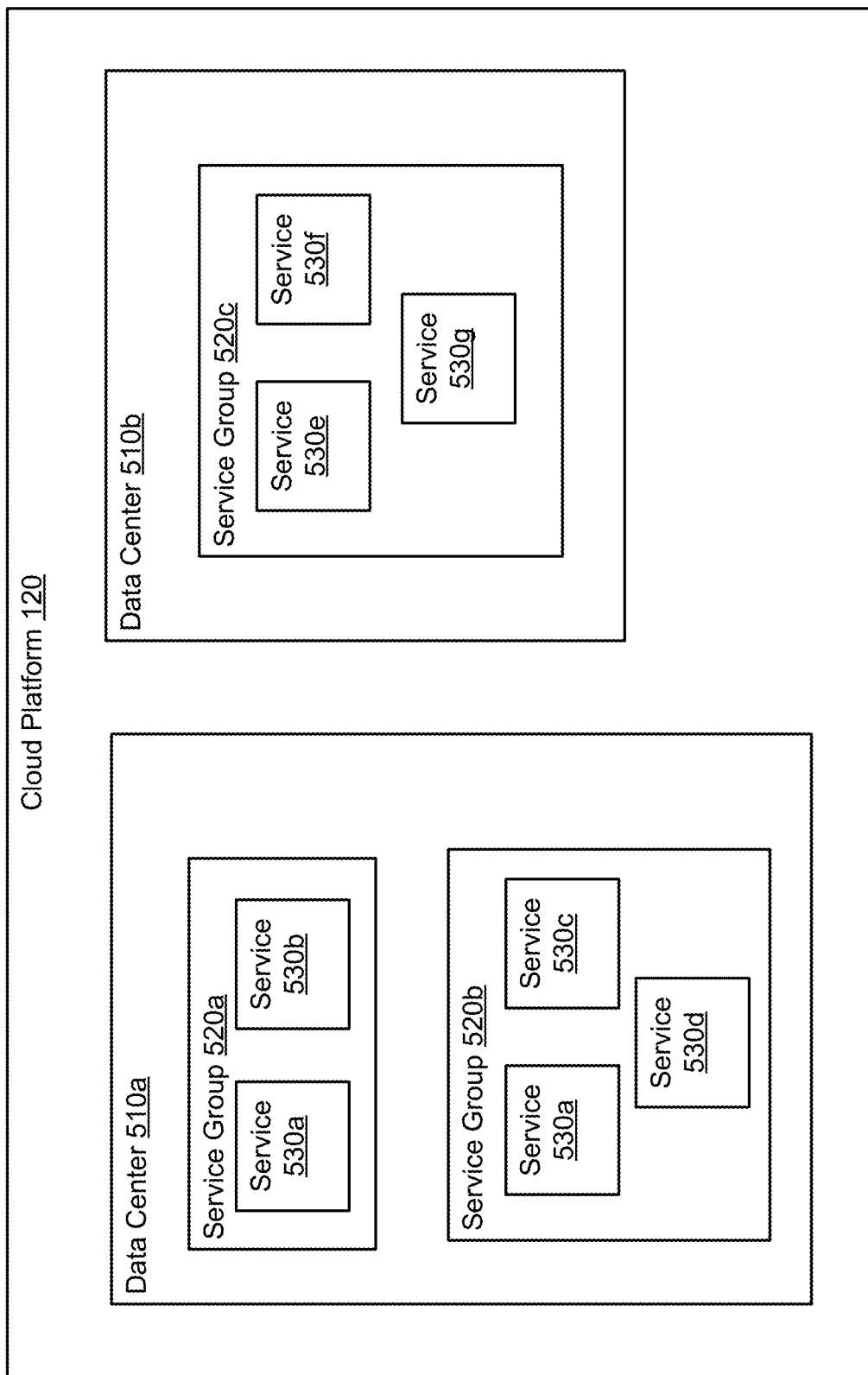
FIG. 5 illustrates example data centers created on a cloud platform based on a declarative specification according to one embodiment.

FIG. 5 illustrates some example data centers created on a cloud platform based on a declarative specification according to one embodiment. The data centers 510 may be created based on a declarative specification processed by the data center generation module 210. As shown in FIG. 5, multiple data centers may be configured within a cloud platform 120. Each data center 510 may correspond to a tenant 115 of a multi-tenant system 110. A tenant 115 may create one or more data centers 510. Alternatively, a data center 510 may be created by any computing system. Each data center includes one or more service groups. For example, data center 510a includes service groups 520a and 520b and data center 510b includes service group 520c. A data center may include multiple instances of a particular type of service group. Each service group includes a set of services. For example, service group 520a includes services 530a and 530b, service group 520b includes services 530a, 530b, and 530c, and service group 520c includes services 530e, 530f, and 530g. A service group may include multiple instances of services of the same service type.

The datacenter generation module 220 creates data centers on cloud platforms based on a declarative specification using the following steps. The data center generation module 210 receives a cloud platform independent declarative specification of a data center. The cloud platform independent declarative specification may be for a tenant of the multi-tenant system or for any other computing system, for example, an online system. The cloud platform independent declarative specification is specified using the cloud platform infrastructure language. The cloud platform independent declarative specification of the data center is configured to generate the data center on any of a plurality of cloud platforms.

The data center generation module 210 receives information identifying a target cloud platform for creating the data center based on the cloud platform independent declarative specification. The target cloud platform could be any of a plurality of cloud platforms, for example, AWS, AZURE, GCP, and so on. The data center generation module 210 further receives information to connect with the target cloud platform, for example, credentials for creating a connection with the target cloud platform. A cloud platform may also be referred to as a cloud computing platform.

The data center generation module 210 compiles the cloud platform independent declarative specification to generate a cloud platform specific data center representation for creating the data center on the target cloud computing platform. For example, the cloud platform specific data center representation may refer to user accounts, network addresses, and so on that are specific to the target cloud computing platform.

The data center generation module 210 sends the platform specific data center representation along with instructions for deploying the data center on the target cloud computing platform. The target cloud computing platform executes the instructions to configure the computing resources of the target cloud computing platform to generate the data center according to the platform specific data center representation. The data center generation module 210 provides users with access to the computing resources of the data center configured by the cloud computing platform. For example, if the data center was created for a tenant of the multi-tenant system, users associated with the tenant are provided with access to the data center.

Figure 6:
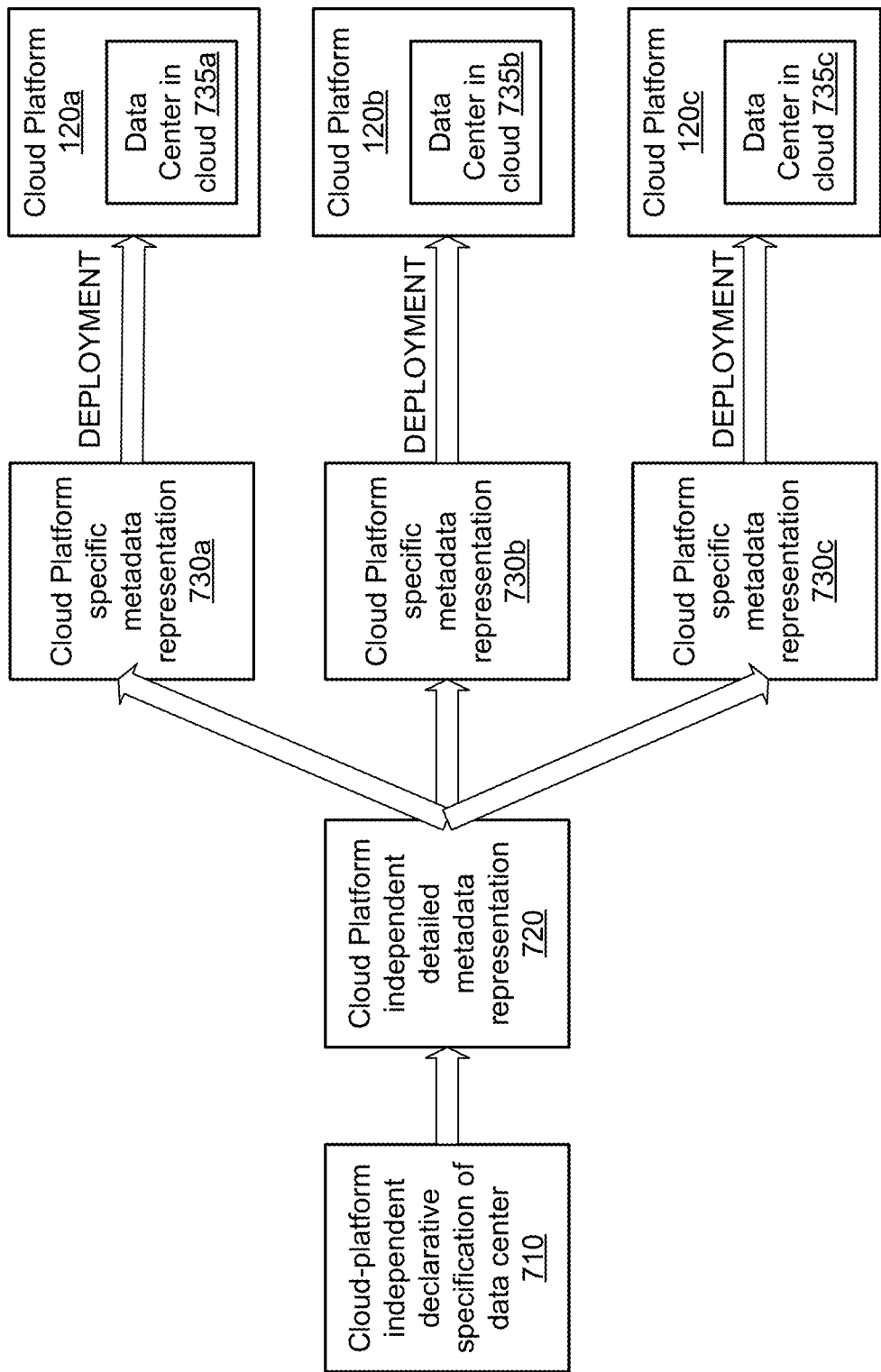
FIG. 6 is a block diagram illustrating generation of data centers on cloud platforms based on a declarative specification, according to one embodiment.

FIG. 6 is a block diagram illustrating generation of data centers on cloud platforms based on a declarative specification, according to one embodiment. The data center generation module 210 receives as input a cloud-platform independent declarative specification 610. The cloud-platform independent declarative specification 610 may be a version of the declarative specification that is being incrementally modified by users. The data center generation module 210 processes a particular version of the cloud-platform independent declarative specification 610. Since cloud-platform independent declarative specification 610 is not specified for any specific target cloud platform, the data center generation module 210 can configure a data center on any target cloud platform based on the cloud-platform independent declarative specification 610.

The data center generation module 210 processes the cloud-platform independent declarative specification 610 to generate a cloud-platform independent detailed metadata representation 620 for the data center. The cloud-platform independent detailed metadata representation 620 defines details of each instance of data center entity specified in the cloud-platform independent declarative specification 610. The data center generation module 210 creates unique identifiers for data center entity instances, for example, service instances.

In an embodiment, the cloud-platform independent detailed metadata representation 620 includes an array of instances of data center entity types, for example, an array of service group instances of a particular service group type. Each service group instance includes an array of service instances. A service instance may further include the details of a team of users that are allowed to perform certain actions associated with the service instance. The details of the team are used during provisioning and deployment by the data center generation module 210, for example, for creating a user account for the service instance and allowing members of the team to access the user account.

The cloud-platform independent detailed metadata representation 620 includes attributes of each instance of data center entity. Accordingly, the description of each instance of data center entity is expanded to include all details. As a result, the cloud-platform independent detailed metadata representation 620 of a data center may be significantly larger than the cloud-platform independent declarative specification 610. For example, the cloud-platform independent declarative specification 610 may be few thousand lines of specification, whereas the cloud-platform independent detailed data center representation 620 may be millions of lines of generated code. As a result, the data center generation module 210 keeps the cloud-platform independent detailed metadata representation 620 as immutable, i.e., once the representation is finalized, no modifications are performed to the representation. For example, if any updates, deletes, or additions of data center entities need to be performed, they are performed on the cloud platform independent declarative specification 610.

The data center generation module 210 receives a target cloud platform on which the data center is expected to be provisioned and deployed and generates a cloud platform specific detailed metadata representation 630 of the data center. For example, the data center generation module 210 interacts with the target cloud platform to generate certain entities (or resources), for example, user accounts, virtual private clouds (VPCs), and networking resources such as subnets on the VPCs, various connections between entities in the cloud platform, and so on. The data center generation module 210 receives resource identifiers of resources that are created in the target cloud platform, for example, user account names, VPC IDs, and so on, and incorporates these in the cloud-platform independent detailed metadata representation 620 to obtain the cloud platform specific metadata representation 630 of the data center. In an embodiment, the data center generation module 210 creates one unique user account on the cloud platform for each team for a given combination of a service group and a service. The user account is used by the team for performing interactions with that particular service for that service group, for example, for debugging, for receiving alerts, and so on.

The target cloud platform may perform several steps to process the cloud-platform specific detailed metadata representation 630. For example, the cloud platform independent declarative specification may specify permitted interactions between services. These permitted interactions are specified in the cloud-platform specific detailed metadata representation 630 and implemented as network policies of the cloud platform. The cloud platform may further create security groups to implement network strategies to implement the data center according to the declarative specification.

The cloud platform independent declarative specification specifies dependencies between services, for example, start dependencies for each service listing all services that should be running when a particular service is started. The data center generation module 220 generates the cloud platform specific detailed metadata representation of the data center that includes information describing these dependencies such that the instructions for deploying the service ensure that the cloud platform starts the services in an order specified by the dependencies such that for each service, the services required to be started before the service are running when the service is started. Accordingly, the dependencies between services represent a dependency graph and the cloud platform starts running the services in an order determined based on the dependency graph such that if service A depends on service B, the service B is started before service A is started.

The data center generation module 220 creates trust relationships between user accounts that allow services to access other services via secure communication channels. These trust relationships are generated using substrate specific instructions generated based on the declarative specification, for example, based on outbound access attributes specified for services. The data center generation module 220 sends instructions to the cloud platform to create network policies based on cloud platform specific mechanisms that control the interactions and access across service groups and services, for example, as specified by the constructs of the declarative specification such as outbound access, security groups, security policies and so on.

The data center generation module 210 deploys the cloud platform specific metadata representation 630 on the specific target cloud platform for which the representation was generated. The data center generation module 210 may perform various validations using the generated metadata representations, including policy validations, format validations, and so on.

The cloud platform independent declarative specification 610 may be referred to as a declared data center representation, cloud-platform independent detailed metadata representation 620 referred to as a derived metadata representation of the data center, and cloud platform specific metadata representation 630 referred to as a hydrated metadata representation of the data center.

Overall Process for Deployment of Software Artifacts on a Datacenter

The system generates pipelines for deployment of software artifacts on datacenters configured on a cloud platform according to an embodiment. The datacenter generation module generates one or more datacenters on a target cloud platform. Each datacenter is generated from a cloud platform independent declarative specification and has a hierarchy of datacenter entities.

The software release management module 230 generates a cloud platform independent master pipeline. In an embodiment, the cloud platform independent master pipeline includes stages corresponding to environments of the datacenters, for example, development environment, test environment, canary environment, and production environment. The master pipeline composes a sequence of progressive and/or conditional deployment across various environments such as development environment, test environment, staging environment, or production environment. The master pipeline may be triggered by delivery of the image for a software artifact and includes stages or instructions to deploy the build in environments of type development. The software artifact that is built is conditionally promoted to one or more test environments, followed by one or more canary environments before eventually getting deployed to production environments. The master pipeline may be customized by users, for example, service owners to represent a specific orchestration across environments. The master pipeline may be customized to capture specific promotion criteria for moving from one stage to next. For example, different tenants of the multi-tenant system may customize the master pipeline in a different manner. In an embodiment, the master pipeline by default uses the latest version of software for a service and builds and deploys the software artifact version across various environments. The user can use the artifact version map to ensure that a specific version of a software artifact is deployed on specific datacenter entities.

In an embodiment, each service deployed in the datacenter has a cloud platform independent master pipeline generated from the datacenter entities as defined by the declarative specification of the datacenter, for example, master pipeline for datacenter instances, master pipeline for service groups, master pipeline for cells, master pipeline for services, and so on. The master pipelines may be triggered on delivery of images of software artifacts. The master pipelines may implement a service owner-controlled continuous deployment. The master pipelines may implement datacenter instance owner-owned or release owner-owned on-demand deployment.

Certain portions of the master pipeline may be customized by the users, for example, by tenants of a multi-tenant system that are deploying services on a datacenter. For example, the promotion decision pipeline may be customized by a tenant to determine which test cases are executed and what threshold is The software release management module 230 receives customizations to logic for promoting a software artifact from one stage to another stage of the cloud platform independent master pipeline.

The software release management module 230 compiles the cloud platform independent master pipeline to generate a cloud platform specific detailed deployment pipeline that is specific to the hierarchy of datacenter entities of each datacenter as specified by the cloud platform independent declarative specification for the datacenter.

The software release management module 230 further receives code for releasing one or more features of services deployed on the datacenter. The code may be represented as a software artifact, for example, a software artifact including instructions for configuring user interfaces generated from administration APIs. The software release management module 230 executes the cloud platform specific detailed deployment pipeline to deploy software artifacts based on the received code.

A master pipeline represents a sequence of stages that represent progressive conditional deployment across various datacenter environments. The master pipeline may include stages for different environments of datacenter including development environment, test environment, canary environment, and production environment. Each stage further represents a pipeline that is executed for that stage. For example, the master pipeline may include a development environment pipeline which feeds into a test environment pipeline, which feeds into a canary environment pipeline, which feeds into production environment pipeline.

The pipeline at each stage is a hierarchical pipeline comprising lower level pipelines. For example, the development environment pipeline may comprise a development master pipeline that feeds into datacenter pipelines D11, D12, . . . , depending on the number of datacenters specified as having development environment in the declarative specification of the datacenters.

The test environment pipeline may comprise a test master pipeline that feeds into datacenter pipelines D21, D22, . . . , depending on the number of datacenters specified as having test environment in the declarative specification of the datacenters.

The canary environment pipeline may comprise a canary master pipeline that feeds into datacenter pipelines D31, D32, . . . , depending on the number of datacenters specified as having canary environment in the declarative specification of the datacenters.

The production environment pipeline may comprise a production master pipeline that feeds into datacenter pipelines D21, D22, . . . , depending on the number of datacenters specified as having test environment in the declarative specification of the datacenters.

Each environment pipeline may include a promotion decision pipeline. The outputs of the datacenter pipelines of the environment pipeline are collected by the promotion decision pipeline that determines whether the software artifact is ready for promotion to the next stage. The promotion decision pipeline may determine based on test case results obtained by the datacenters whether the software artifact for the service is promoted to the next stage. For example, if more than a threshold test cases are passed, the promotion decision pipeline promotes the software artifact to the next stage. The last environment stage, for example, the production environment pipeline may not have a promotion decision pipeline since there is no subsequent stage to which the software artifact needs to be promoted. The promotion decision pipeline of development environment pipeline determines whether to promote the software artifact from development stage to test stage; the promotion decision pipeline of test environment pipeline determines whether to promote the software artifact from test stage to canary stage, and the promotion decision pipeline of canary environment pipeline determines whether to promote the software artifact from canary stage to production stage.

A master pipeline comprises multiple pipelines, for example, a provisioning pipeline for provisioning resources of the target cloud platform and a deployment pipeline for deploying a software artifact on a data center entity. Each pipeline comprises a sequence of stages, each stage representing one or more actions that need to be performed by the target cloud platform towards provisioning and deploying of the data center. The data center generation module 210 generates detailed pipelines for deploying versions of software artifacts on datacenter entities.

In an embodiment, the pipeline generator module 320 generates detailed pipelines using pipeline templates that include variables. A pipeline template is converted into a pipeline by providing specific values of the variables in the pipeline. The process of generating a pipeline from a template is referred to as hydration of the pipeline template. A pipeline template contains templating expressions used as placeholders for actual values used in the deployment. For example, a templating expression may be replaced by target specific parameter values or expressions. Multiple pipeline instances may be generated by hydrating the pipeline template for different targets. The template variables represent parameters that may be replaced with specific values for a given target to generate a pipeline instance specific to that target. For example, a template variable "account_id" may be replaced with an actual value of account_id, for example, "12345" during hydration.

In one embodiment, the pipeline generator module 320 generates pipelines in a hierarchical fashion based on the hierarchy of the data center entities of the data center. For example, the data center comprises data center entities of different types including data centers, service groups, services, and so on. A data center entity may include one or more child data center entities. For example, a data center includes one or more service groups as child data center entities. A service group includes one or more services as child data center entities. Accordingly, the data center generation module 210 starts at a data center entity at a level of the hierarchy and generates pipelines of data center entities below that level. For example, the pipeline generator module 320 starts at the data center level and generates pipelines for service groups within the data center. For each service group, the pipeline generator module 320 generates pipelines for services within the service group.

The process for executing pipelines according to one embodiment is as follows. The software release deployment module 230 receives a request to deploy a software artifact on a set of data center entities in the target cloud platform. The software release deployment module 230 executes the master pipeline for one or more datacenters. The software release deployment module 230 executes the aggregate pipelines for each service group of each datacenter. The aggregate pipeline comprises pipelines for services within the service group. For each service within each service group, the pipeline is executed by executing all the stages of the pipeline. The execution of the provisioning pipelines results in provisioning of the resource for a service and the deployment pipeline causes deployment of the service in the target cloud platform.

Software Artifact Version Map

In an embodiment, the deployment module 210 receives an artifact version map that associates various software artifacts and their versions with datacenter entities. The artifact version map provides a declarative specification of the specific versions of software artifacts that need to be deployed for services in different datacenter entities. Each datacenter entity may be uniquely identified based on its location within the datacenter hierarchy as specified by the declarative specification of the datacenter. For example, for a service, a software library may act as a software artifact. The software artifact may have multiple versions, for example, V1, V2, V3, and so on. The artifact version map may specify that version V1 needs to be deployed in datacenter entities C1 and C2 and version V2 needs to be deployed in datacenter entities C3 and C4. The deployment module 210 generates master pipelines and instructions that ensure that the appropriate software artifact versions are deployed in the datacenter entities as specified in the artifact version map.

In an embodiment, the artifact version map is specified as a JSON (Javascript object notation) file, a YAML file, or a file using any other syntax for representing nested objects. The artifact version map may comprise a set of <service>:<version> key pairs that are associated with various datacenter entities distributed across a hierarchy of a datacenter. The artifact version map key pairs act as whitelists for corresponding pipelines. If a key for a service is not included into an artifact version map, all pipelines for that service are excluded during execution of the pipeline. Different artifact version maps may be applied to the same master pipeline resulting in different services being included/excluded during execution of the master pipeline.

Following is an example artifact version map. The artifact version map specifies environment types using the attribute "env_types". In the following example, the environment type development is specified. The environment type may include one or more datacenter instances; a datacenter instance may include one or more service groups, a service group may include one or more services. In the following example, the software artifact name is specified as library1 and version as version1 and is associated with the service instance instance001. However, the software artifact name and version may be associated with any level of datacenter entity in the hierarchy. For example, of the software artifact name and version is specified or a service group, the software artifact name and version is applicable to all services within the service group unless the software artifact name and version is overridden with different values of the software artifact name and version specified for a particular service instance within the service group. Similarly, the software artifact name and version can be specified for a datacenter instance and is applicable to all service groups or cells within the datacenter instance unless an overriding value is specified for a service group.

```
{
  "name": "artifact_version_map1",
  "schema_version" : "0.1",
  "release_label" : "release1.1",
  "deployments": {
    "env_types" : [
      {
        "name": "development",
        "datacenter_instances": [
          {
            "name": "datacenter1",
            "service_group": [
              {
                "name": "service_group1",
                "services": [
```

```
            {
                "service_instance": "instance001",
                "name": "service1",
                "versions": [
                    {
                        "software_artifact_name": "library1",
                        "version": "version1"
                    }
                ]
            }
          ]
        }
       ]
      }
     ]
    }
   ]
  },
 }
}
```

In an embodiment, the artifact version map specifies a datacenter entity using a full path of the datacenter entity, for example, "stagger_group1/datacenter1/service_group2/service1". In an embodiment, the artifact version map specifies a set of datacenter entities using regular expressions in the full path of the datacenter entity. For example, a full path that includes service_group[?] includes service_group1, service_group2, service_group3, and so on.

Following is an example of an artifact version map specifying regular expressions to define a set of services. The environment types are specified as dev and test and the datacenter entities in the full path including datacenter instances and service groups are specified as wildcards and service instances are specified as "service*". Accordingly, for all datacenter instances for dev and test environments, for all service groups, for services names matching service*, the version V1 of application app1 will be deployed.

```
env_types:
   - name: "dev | test"
     datacenter_instances:
        - name: "(.*)"
          service_group:
             - name: "(.*)"
               services:
                  - service_instance: "service*"
                    name: "app1"
                    versions:
                       version:"V1"
```

In some embodiments, the artifact version map may specify parameters used by pipelines. Accordingly, the specified parameters will be applicable to a stagger group for which the parameter is specified.

The artifact version map and master pipelines can be used to orchestrate various types of operations related to continuous delivery of software artifacts in a cloud-based datacenter. The artifact version map and the master pipelines can be configured to perform aggregate retry operations for a service or a service group or any datacenter entity. The artifact version map includes configurations of retry operations for a datacenter entity, including the retry strategy, a threshold number of retries to perform in case of failure to execute a stage of a pipeline, whether confirmation from a user is required before retrying or retry is performed automatically, and so on. For example, a retry strategy may be a fixed backoff strategy that pauses execution for a fixed period of time before retrying. Other retry strategies may be configured using artifact version map and master pipelines.

In an embodiment, the pipeline generator introduces an invoke retrier stage within an aggregate pipeline to trigger a retry strategy if a previous pipeline stage fails. The retry strategy and configuration parameters specified for a datacenter entity applies to all datacenter entities and services within the datacenter entity unless the value is overridden for a nested datacenter entity.

Cloud Infrastructure for Managing Administration Operations

As described above in conjunction with FIG. 3, the deployment module 210 further includes components (e.g., administration module 370) for configuring and deploying a cloud infrastructure for managing administration operations of services on the cloud platforms 120. Specifically, different entities associated with the multi-tenant system 110 may run multiple, large-scale services on cloud platforms 120, and may perform various administration operations to manage these services. For example, the administration operations may relate to optimizing, recovering, debugging applications or servers for a service. For example, administration operations may include resetting the password for a user, restarting a server, clearing a cache, modifying storage configurations for an application, granting access to specific users, enabling features, or increasing limits.

In one implementation, an administration operation may be performed by invoking one or more application programming interfaces (API's). Conventionally, administration operations are usually executed by human operators, from customer service personnel supporting end users to application developers debugging issues with an application. Since exposing API's can create security risks, an appropriate set of compliance and access and authorization controls (e.g., proper user authentication and authorization) are also implemented to reduce risk exposure. Also, appropriate procedures should be in place such that information related to the API request, such as the user submitting the request, approver of the request, or a timestamp of executing the request should be properly audited and recorded so that relevant entities (e.g., tenants) can review the audited information when needed. For example, there may be unwanted access attempts to the data for a tenant, and by examining the audit data, the entity responsive for managing the multi-tenant system 110 as well as the tenant can determine who or when the unwanted attempt happened to prevent such future attempts. As another example the audit data can be analyzed to further understand how a service or product associated an API is being used. However, since the cloud platforms 120 associated with the multi-tenant system 110 deploy many types of services across, for example, different data centers 125 and different entities, it is difficult for the multi-tenant system 110 to manage administration operations performed on the cloud platforms 120 with respect to security, policy compliance, audit, just-in-time and time-based access controls, and the like.

Thus, the deployment module 210 configures and deploys a cloud infrastructure for managing administration operations executed on the cloud platform 120. The cloud infrastructure includes one or more control datacenters configured to communicate with one or more service datacenters. In one embodiment, the service datacenter deploys one or more API's associated with a service. The service datacenter also deploys one or more instances of an administration agent. The control datacenter hosts an administration engine that receives requests from users to perform administration operations by invoking one or more administration API's.

Responsive to an approval process and a request from a user to invoke the approved administration operation, the administration engine communicates the request to a service datacenter deploying API's for the administration operation. The administration agent of the service datacenter requests the invocation of the API's for the request and returns the response to the administration engine. In one instance, the administration engine receives administration operation requests through a user interface deployed by the control datacenter that facilitates interaction between users and instances of services run by the service datacenters.

In one embodiment, the administration engine and administration agents communicate by employing a publish-subscribe messaging mechanism. Specifically, the administration engine forwards an administration operation request to a message broker. The message broker publishes a message including the request and security information associated with the request to one or more topics that are named logical channels or resources to which messages are sent by the message broker. The message is picked up by an administration agent that subscribes to the particular topics. Responsive to receiving the message and performing security compliance measures, the administration agent executes the request and provides the response back to the administration engine.

In this manner, the control datacenter functions as a centralized control mechanism that effectively distributes administration operation requests as they are received from users to service datacenters that can service the requests. Moreover, the administration engine that receives an operation request resides within a control datacenter which is logically separate from the service datacenters that deploy the administration API's. Since the administration engine and the administration agent each reside within their own respective datacenters behind a secure network boundary and communicate via a message broker, the cloud infrastructure significantly reduces the likelihood of any endpoint exposure. Thus, the cloud infrastructure can reduce security exposure compared to conventional ways of servicing API requests while providing an efficient way of executing administration operations.

Block Diagram of Administration Module

Figure 7:
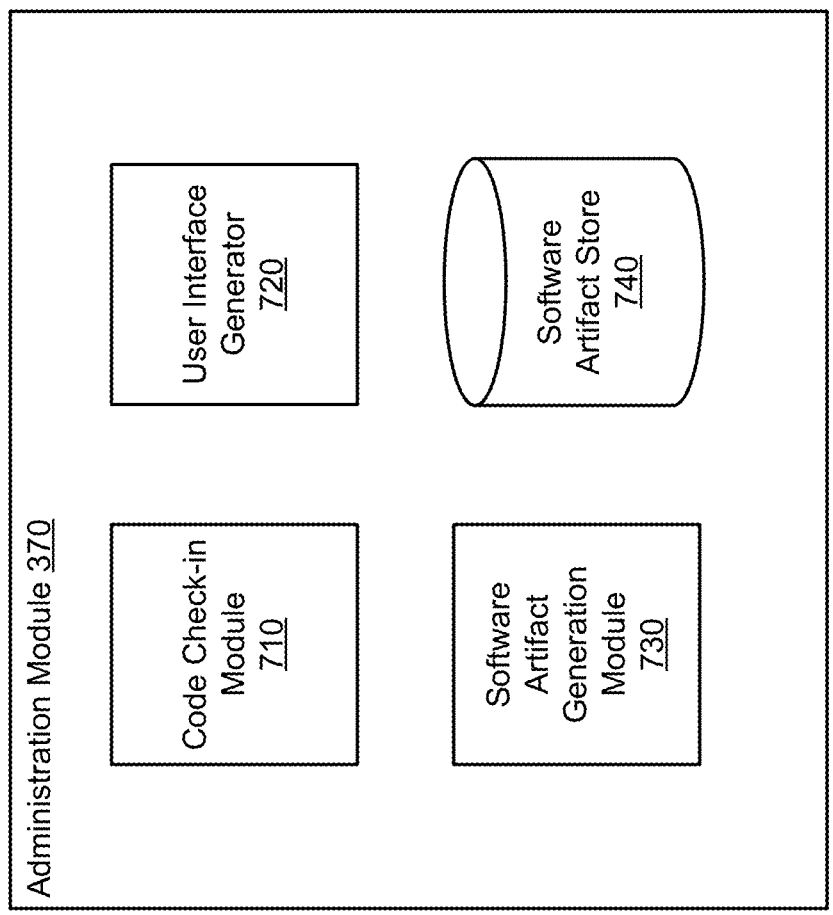
FIG. 7 is a block diagram illustrating the architecture of an administration module according to one embodiment.

FIG. 7 is a block diagram illustrating the architecture of an administration module 370 according to one embodiment. The components of the administration module 370 receive requests to register administration API's from operation owners. The components of the administration module 370 also generate instructions for configuring a set of UI components for receiving requests to perform one or more administration operations. Specifically, the administration module 370 comprises a code check-in module 710, a user interface generator 720, a software artifact generation module 730, and a software artifact store 740. Other embodiments may include more or fewer modules than those indicated in FIG. 7.

The code check-in module 710 receives code related to services checked in by developers. Specifically, developers may provide new features for services or modify existing features. These changes are implemented by developers using modifications to source code associated with services. In one embodiment, the code check-in module 710 is integrated with version control software, such as Git or SVN, and a developer can submit new or updated versions of source code to the code check-in module 710 through the repository.

The code check-in module 710 receives a request to register one or more administration API's associated with an administration operation to an appropriate service datacenter. Specifically, the registration request may be submitted by an "owner" of the administration operation. The owner of the administration operation is any person or entity responsible for processing the administration operation, and may be, for example, the developer of an API, an operator with authorization to register and manage the API, any user who assumes a particular role, security clearance level, and the like. There may be multiple owners for one API. Moreover, while typically one administration operation may be associated with a respective administration API, in other cases, one administration operation may be associated with two or more administration API's across one or more services. Responsive to the registration request, the code check-in module 710 may be responsible for ensuring that the one or more administration API's are deployed in the appropriate service datacenters 920.

The registration request received by the code check-in module 710 may include an API specification for defining an administration API. Specifically, the API specification is a document that defines how the API works, and in particular, describes the rules of interaction with the API and the type of response that can be expected by invoking the API. In one embodiment, the API specification is received as a document following either OpenAPI or RAML standards, and may be provided using a markup language, for example, XML, YAML, or JSON. The API specification may be generated by processing source code for the administration API.

Specifically, the content of an API specification may include metadata, such as the API title, version, one or more server URL's for calls to the API, and other types of descriptive information. The API specification may also include path items that are the endpoints of the API for manipulating the resources in a desired manner. The API specification may also describe expected responses and methods associated with the responses, such as a GET (e.g., retrieve representation of resource), DELTE (e.g., delete a resource), PUT (e.g., update resource), POST (e.g., create new resource) methods. The API specification may also describe one or more parameters for input that can be specified by the requestor to shape the response in a particular way. For example, a parameter may be a query parameter that limits the amount of information retrieved for the response, or a path parameter that points to a specific resource, among other types of parameters.

FIG. 8 illustrates an example API specification 805 describing an administration operation for a pet store online service. The administration operation allows a user to retrieve a list of kittens from the store. The example specification 805 follows an OpenAPI standard. In addition to other types of information, the example specification 805 includes a REST request of method type GET that is sent to the resource/list reachable via the hostname http://kitten.rescue.store/v1 when the operation is executed. In particular, the method is associated with query parameters limit and location as listed under the identifier parameters. The query parameter limit specifies how many results should be returned in the response. The query parameter location specifies the location of the branch of the pet store that the user is interested in.

An API specification may also specify the data structure of each parameter that describes, for example, the data type (e.g., string, integer, object) and any limitations on the input values for the parameter. In the example specification 805 shown in FIG. 8, the data structure of each parameter is specified under the identifier schema. For example, the input value for the limit parameter is of data type integer and format int32. As another example, the input value for the location parameter is of data type string. However, different from the limit parameter, the location parameter is additionally an enum parameter that restricts the input values to a fixed set of values. In the example specification 805 of FIG. 8, the enum values are limited to a set of locations the pet store has branches in.

Moreover, while the example specification 805 illustrates parameters that support primitive values or arrays, an API specification may also include parameters with non-primitive values, such as JSON objects. In such an instance, the schema for the parameter may specify one or more properties of the object, and the API specification or an external specification may also indicate the data structure of these properties. For example, the following schema for a JSON object as a parameter may specify two properties property A and property B, each with data type string. Thus, a respective method associated with an object parameter may receive input values for each property of the object according to the data structure specified in the API specification.

schema:
      type: object
      properties:
        property A:
          type: string
        property B:
          type: string The example specification 805 also indicates that the response can be expected to be in the form of a JSON array. Each element of the JSON array is comprised of three key-value pairs to represent each pet. The first key-value pair indicates the unique identifier (ID) of the pet, the second key-value pair indicates the name of the pet, and the third key-value pair indicates the breed of the pet.

In addition to the API specification, the request may also include information such as the service associated with the administration API, the team or department responsible for managing the API, and the like. In particular, the registration request may include operator information. The operator information includes a list of individuals or groups (e.g., roles, teams, organizations) of individuals allowed to submit requests to invoke the API. The registration request may also include approver information. The approver information includes a list of roles (e.g., groups of individuals with particular roles) or individuals that can approve a request to invoke the administration API once a request is submitted by an operator. Thus, the user policy for an administrative API may dictate which user can submit and approve requests, and may be stored in a data storage of a directory service such as a Lightweight Directory Access Protocol (LDAP) in association with the administrative API. In some instances, an operator may be on an auto-approved list that indicates a list of individuals or groups that can be auto-approved without going through a separate approver.

In one embodiment, the code check-in module 710 also allows an owner to define an administration operation as a group operation that includes multiple API's. Specifically, as described in more detail below, the cloud infrastructure may allow integration of custom applications for custom workflows that involve calls to multiple API's for one operation, and the owner may define group operations as needed for the custom workflow.

The user interface generator 720 generates instructions for configuring a set of user interface (UI) elements for receiving requests to perform an administration operation by invoking one or more administration API's. Specifically, as described above, the administration engine in a control datacenter receives requests to invoke one or more administration API's in conjunction with an administration operation. The multi-tenant system 110 and the cloud platform 120 may provide a significant number of services across multiple tenants and entities (e.g., customers, teams, organizations). However, it may be difficult for users to submit requests to perform administration operations because, for example, users may have to understand the syntax for invoking API's and owners of different administration operations may use different methods to configure administration API's. In addition, a user simply may not have expertise in making API calls.

Thus, it is advantageous for the cloud infrastructure on the cloud platform 120 to deploy user interfaces to facilitate interactions between services and users and provide a standardized and centralized mechanism for submitting requests to perform administration operations. Since a multi-tenant system 110 may manage a significant number of services and entities, it would be technically extremely difficult for the multi-tenant system 110 to manage and monitor compliance if each entity associated with the multi-tenant system 110 was allowed to develop a different way of invoking administration operations. Thus, the cloud infrastructure and the user interface deployed by the cloud infrastructure provide a standardized way of submitting requests for administration operations that is compliant with security policies. However, generating user interfaces for invoking administration API's is a difficult task because front-end technology is often foreign to developers of a back-end service. Moreover, as the number of administration API's increase, the effort required to generate user interfaces for these API's may incur significant cost.

Thus, the user interface generator 720 receives an API specification and assembles instructions for a user interface configured to receive requests to perform an administration operation associated with the API. The instructions may later be used by components of the control datacenter to deploy such a user interface for receiving operation requests. Responsive to submitting an API specification with the code check-in module 710, the user interface generator 720 may be responsible for building, managing, and packaging the user interface components to control datacenters such that the requests associated with the administration API can be received through the user interface.

Specifically, the user interface generator 720 may receive an API specification and parse the API specification to obtain different components of the administration API, including endpoints, methods, and parameters of the administration API. In one embodiment, the user interface generator 720 may identify different components by using indicators that signal the presence of a respective component in the API specification.

In one instance, the indicator for an endpoint of the API is a field labeled url, and the user interface generator 720 may obtain the value of the field as the endpoint of the API. In one instance, the indicator for a method (e.g., REST request) are fields labeled get, put, post, delete among others. For each identified method, the user interface generator 720 may identify one or more parameters for invoking the method. In one instance, the indicator for parameters is a field labeled parameters, and the user interface generator 720 obtains the name of each parameter associated as the values of fields labeled name in the portion of the code placed below or after the parameters indicator.

For each parameter, the user interface generator 720 further identifies the data structure for the parameter. In one instance, the indicator for the data structure of a parameter is a field labeled schema. The user interface generator 720 obtains the data type of the parameter as the value of the field labeled type in the portion of the code placed below or after the schema indicator. The user interface generator 720 may also obtain any additional limitations on the input values of the parameter by determining additional properties of the parameter. For example, the additional properties may specify whether the parameter is an enum parameter, whether the parameter is associated with minimum or maximum values, and the like.

However, it is appreciated that other methods can be used to determine the components of an API specification depending on, for example, different standards used for the API specification. For example, different types of indicators may be used depending on the API standard. In addition, the user interface generator 720 may also determine the components from other types of documents describing the API, such as the API definition instead of the API specification.

After the components have been determined, the user interface generator 720 generates instructions for generating a set of UI elements configured to receive input values for one or more parameters of the administrative API. Specifically, the user interface generator 720 generates instructions for generating the set of UI elements based on the data structures of the parameters determined through parsing the API specification. In one embodiment, the instructions are generated using web-based language such as HTML, CSS, and JavaScript. However, embodiments are not limited hereto, and any other language for generating UI elements can be used to generate the instructions.

For example, for a parameter with a data type of integer or string (e.g., the limit parameter in FIG. 8), the user interface generator 720 may generate instructions for a text field UI element configured to receive text or numbers entered by a user. As another example, for an enum parameter with a fixed set of values (e.g., the location parameter in FIG. 8), the user interface generator 720 may generate instructions for a checkbox UI element, dropdown list UI element, or list box UI element configured to display the fixed set of values for the parameter and receive user selection on one or more of the values. As another example, for a parameter having a minimum or maximum value, the user interface generator 720 may generate instructions for a slider scale UI element configured to display a sliding scale bound within the minimum or maximum value of the parameter and receive user selection on an input value by moving the slider across the scale. An example UI that includes the rendered UI elements will be presented below in conjunction with the UI application 1030 of FIG. 10.

In an embodiment, the user interface generator 720 generates a composite UI element for each object, for example, a panel, a frame, or a window such as a popup window. The composite UI element includes basic UI elements corresponding to the various attributes of the parameter. For example, if a parameter is an Object O1 that includes attribute a1 of type T1, attribute a2 of type T2, and attribute a3 of type T3, the user interface generator 720 may generate a composite UI element U1 such as a UI panel representing the Object O1. The composite UI element U1 includes basic UI elements such as text boxes, buttons, and so on corresponding to each of the attributes a1, a2, and a3. An attribute of the Object O1 may be a nested object. For example, the Object O1 may include in addition, an attribute a4 that is another object O2 nested within object O1, such that object O2 further comprises a set of attributes. The user interface generator 720 may generate a second composite UI element U2 for the object O2 and link the two composite UI elements U1 and U2. Accordingly, the composite UI element U1 acts as a parent UI element and the composite UI element U2 acts as a child UI element. For example, the composite UI element U2 may be another UI panel. The UI panel corresponding to the object O2 may be embedded within the UI panel corresponding to object O1, for example, as a nested UI panel. The composite UI elements U1 and U2 may be independent windows such that the composite UI element U1 includes a link or a button that causes the composite UI element U2 to open (e.g., pop up as a new window). In an embodiment, the composite UI element U2 stays open only while the parent composite element U1 is open such that closing of the composite UI element U1 causes all child composite UI elements to be closed.

The software artifact generation module 730 generates a software artifact based on the source code generated by the user interface generator 720. The software artifact generation module 730 packages the source code for generating the set of UI elements into a software artifact and deploys the software artifact to one or more control datacenters. The software artifact generation module 730 may deploy the software artifact using the various continuous integration and continuous delivery (CI/CD) techniques disclosed herein. The software artifact store 740 stores the software artifacts generated by the software artifact generation module 730. The software artifact store 740 may store different versions of a particular software artifact.

Process for Management of Administration Operations

Figure 9:
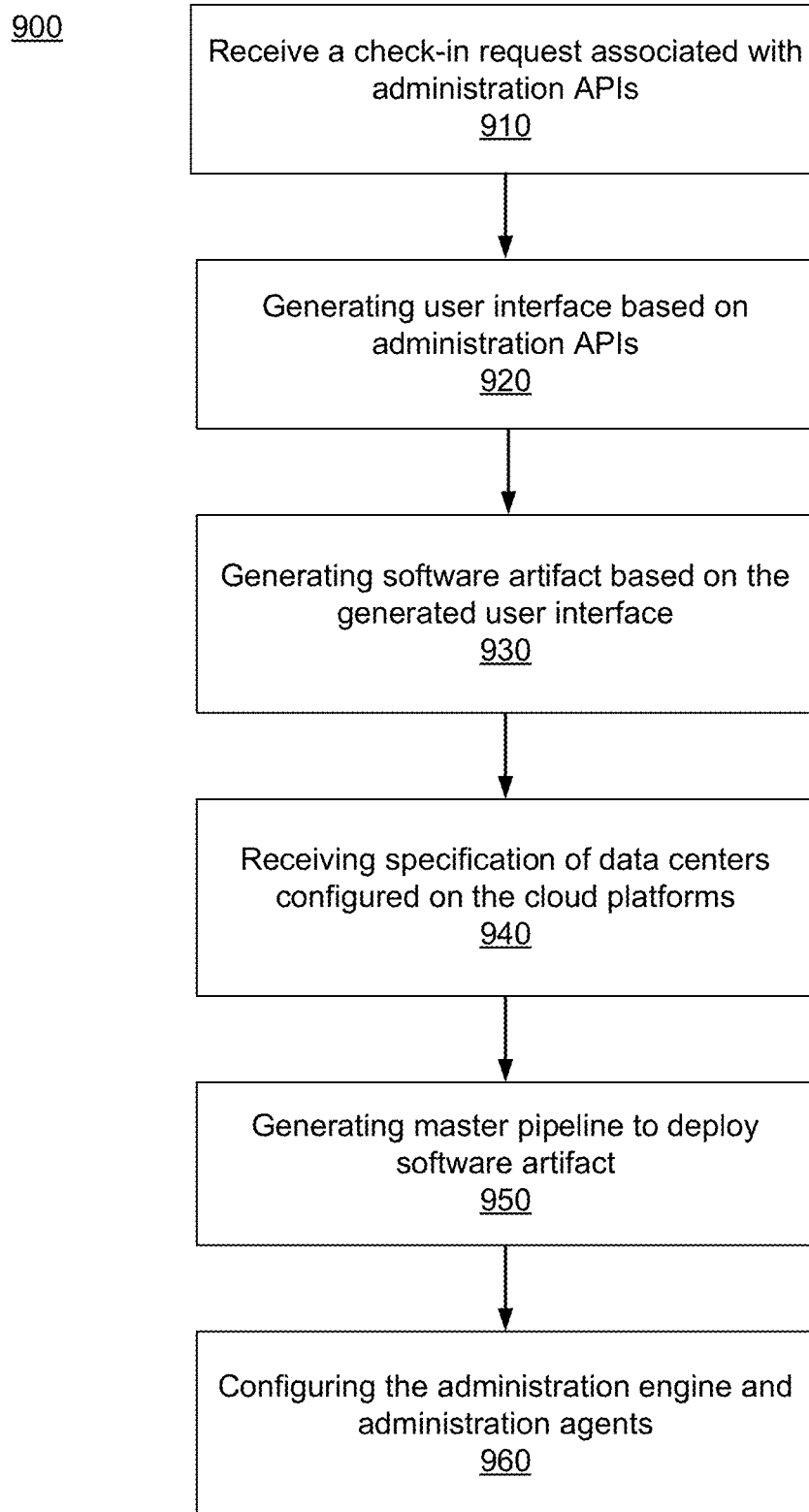
FIG. 9 shows the overall process for configuring cloud infrastructure for management of administration operations of services according to an embodiment.

FIG. 9 shows the overall process for configuring cloud infrastructure for management of administration operations of services according to an embodiment. The steps shown in FIG. 9 may be performed in an order different from that indicated in FIG. 9.

The code check-in module 710 of the administration module 370 receives 910 a check-in request associated with one or more administration APIs. The check-in request may provide source code for an administration API as well as specification of the administration API. The specification of the administration API may be provided using a markup language, for example, XML or YAML. The specification for an administration API may be generated by processing the source code for the administration API.

The user interface generator 720 of the administration module 370 generates 920 instructions for configuring user interfaces based on the administration APIs. The user interface generator 720 may process the specification of an administration API to generate 920 instructions for configuring the corresponding user interface based on the administration API.

The software artifact generation module 730 of the administration module 370 generates a software artifact based on the instructions for configuring user interfaces generated by the user interface generator 720 for the administration APIs. The software artifact packages the instructions for deployment in the cloud platforms.

The deployment module 210 receives specification of data centers configured on the cloud platform. The specification is a declarative specification that describes a hierarchy of data center entities corresponding to one or more data centers. The specification describes a control datacenter and one or more service datacenters. The control datacenter runs an administration engine. A service datacenter runs an instance of the service and an administration agent associated with the instance of the service.

The deployment module 210 generates a master pipeline for deploying the software artifact in the data center. The deployment module 210 further receives a software artifact version map that maps the generated version of the software artifact based on the administration APIs to the control datacenter. The software artifact version map further maps the appropriate version of a service and an administration agent to a service data center. In one instance, a control datacenter runs one version of an administration engine and a service datacenter runs one version of an administration agent. The administration engine and the administration agent may be capable of invoking different versions of administration API's as long as the service associated with the API's are capable of supporting the different versions of API's.

The deployment module 210 executes the master pipeline to configure 960 the administration engine and the administration agents in the cloud platform 120. Accordingly, the administration engine is configured to run in a datacenter entity in the control datacenter. For example, the administration agent may run in a control functional domain that represents a group of services in the control datacenter. Specifically, a functional domain may represent a set of capabilities and features and services offered by one or more computing systems that can be built and delivered independently, in accordance with one embodiment. The administration agent may run in a particular service group, for example, a particular functional domain of a service datacenter.

Configuration of Cloud Infrastructure

Figure 10:
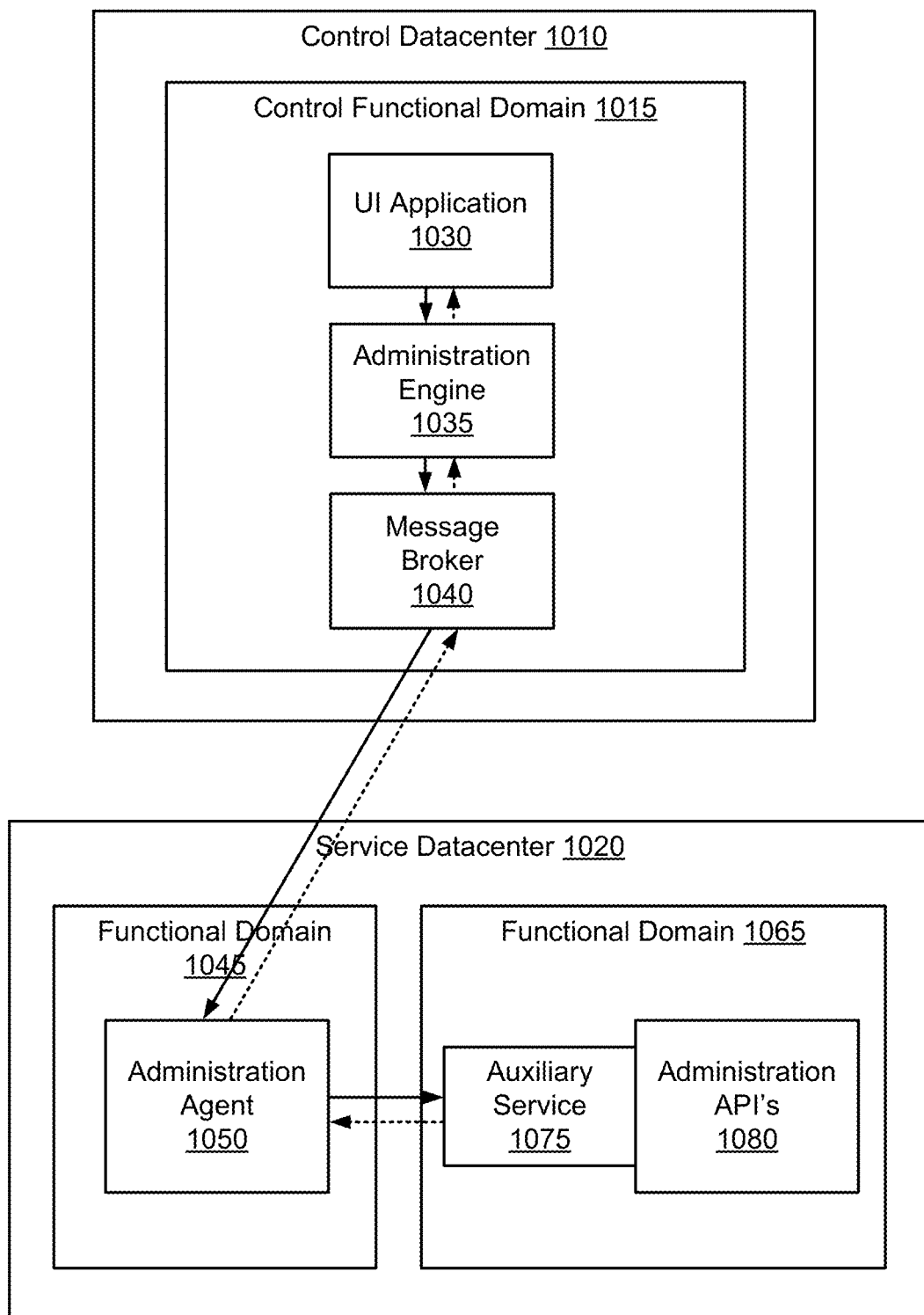
FIG. 10 shows the overall configuration of a cloud infrastructure including an administration engine and administration agents for managing administration operations according to an embodiment.

FIG. 10 shows the overall configuration of a cloud infrastructure including an administration engine and administration agents for managing administration operations according to an embodiment. As illustrated in FIG. 10, the cloud infrastructure presented herein includes a control datacenter 1010 in communication with a service datacenter 1020. A service datacenter 1020 may run one or more instances of services. In one instance, each of the datacenters 1010 and 1020 may have their own respective network boundaries.

The control datacenter 1010 includes a control functional domain 1015. In one embodiment, the control functional domain 1015 includes a UI application 1030, an administration engine 1035, and a message broker 1040. The service datacenter 1020 may be an environment that runs instances of services for one or more applications. The service datacenter 1020 includes a functional domain 1045 and a functional domain 1065. Specifically, the functional domain 1065 deploys one or more API's 1080 coupled to a library 1075. The administration API's 1080 may be organized with respect to one or more services or one or more applications. For example, a first service may be associated with a first group of API's 1080 and a second service may be associated with a second group of API's 1080.

The functional domain 1045 includes an administration agent 1050. In one instance, an administration agent 1050 may be responsible for invoking API calls associated with one or more services or one or more applications in a respective service datacenter 1020. Moreover, a service datacenter 1020 may have multiple instances of administration agents 1050 running and sharing load for processing API requests. For example, an administration agent 1050 residing within a first service datacenter may be responsible for invoking API's associated with the first service datacenter and another administration agent 1050 residing within a second service datacenter may be responsible for invoking API's associated with the second service datacenter. Each functional domain 1015, 1045, and 1065 may inherit regulations or settings used by the respective datacenter it resides in. Moreover, each functional domain 1015, 1045, and 1065 may be associated with its own application-specific configurations, microservices, storage systems, and the like.

While FIG. 10 illustrates a cloud infrastructure including one control datacenter 1010 in communication with one service datacenter 1020, it should be appreciated that in other embodiments, the cloud infrastructure may have different configurations other than the configuration illustrated in FIG. 10. For example, one control datacenter 1010 may be coupled to communicate with multiple service datacenters 1020. As another example, the cloud platforms 120 may be distributed across multiple geographical locations, and the cloud infrastructure may have multiple control datacenters 1010 that are each assigned to service a particular region (e.g., U.S., Europe, Asia, Africa, etc.).

In addition, FIG. 10 illustrates a configuration in which the service datacenter 1020 deploys one or more administration API's 1080 within the functional domain 1065 that is associated with one type of service. However, in other embodiments, it is appreciated that the service datacenter 1020 may include multiple functional domains that are associated with multiple services and may deploy additional administration API's associated with the additional services in addition to those shown in FIG. 10. The service datacenter 1020 may also include additional administration agents that can invoke the additional API's or one administration agent may be responsible for invoking API's for multiple services.

UI for Administration Operation Requests

Responsive to receiving the software artifact from the software artifact generation module 730, the UI application 1030 in a control datacenter 1010 retrieves instructions for generating the set of UI elements in the software artifact for each administration API. The UI application 1030 may store the instructions by service and administration operation within each service. The UI application 1030 receives a request to access the user interface for submitting an administration operation request from a user. In one instance, responsive to receiving the request, the UI application 1030 redirects the user to complete a user authentication process that confirms the user is authenticated to access the cloud infrastructure.

In one embodiment, responsive to user authentication, the UI application 1030 generates a page on the client device that allows the user to select among available services and available administration operations within the selected service. The page may be presented on a web browser or an application on the client device. Responsive to selection, the UI application 1030 renders the set of UI elements for the administration operation as a collection of parameters for the administration API. Responsive to the user providing the input values through the set of UI elements, the UI application 1030 formulates the administration operation request based on the collected information and provides the request to the administration engine 1035. Responsive to receiving the response from the administration engine 1035, the UI application 1030 renders the response on the page for the user to view.

Figure 11:
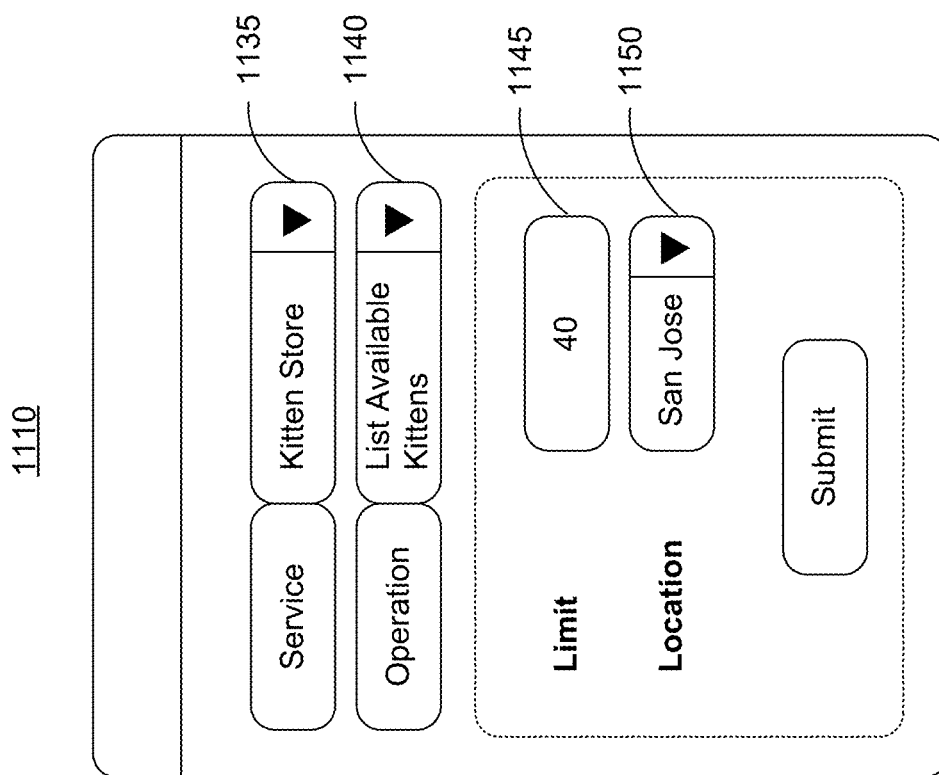
FIG. 11 illustrates an example page rendered by the UI application on a client device according to an embodiment.

FIG. 11 illustrates an example page 1110 rendered by the UI application 1030 on a client device according to an embodiment. The example page 1110 is configured to receive requests to perform administration operations and may be rendered by the UI application 1030 on a web browser or an application of the client device. Among other components, the example page 1110 includes a dropdown list UI element 1135 with a downward arrow button that when clicked by the user, presents available services for selection to the user. In the example shown in FIG. 11, the "Kitten Store" service has been selected by the user of the request. Responsive to the service selection, the example page 1110 includes a dropdown list UI element 1140 with a downward arrow button that when clicked by the user, presents available administration operations within the "Kitten Store" service for selection to the user. In the example shown in FIG. 11, the "List Available Kittens" service has been selected by the user of the request.

Responsive to the selection of the administration operation, the UI application 1030 retrieves the set of UI elements built for the administration operation and renders the set of UI elements on the page 1110 as a collection of parameters. Specifically, the example page 1110 includes a text field UI element 1145 that a user can use to input values for the parameter limit. The user has input a list of 40 maximum items in the response. The page 1110 also includes a dropdown list UI element 1150 with a downward arrow button that when clicked by a user, presents available branch locations for the response. The location "San Jose" has been selected by the user. Responsive to the user clicking the submit button, the UI application 1030 collects the parameter information and formulates the request to invoke the administration API's for the operation. The UI application 1030 renders the response on the page for the user to view.

Moreover, in addition to the parameter information, the user interface may also include options for users to specify additional metadata, such as reason for the request, description of the request, and one or more properties of a policy object for the request. The properties of the policy object may specify a request validity period indicating the amount of time an approval for a request should be valid, whether to allow modification of the parameter values multiple times, or which target functional domain if any should be selected for executing the request. The UI application 1030 may formulate the request with the specified metadata in addition to the input values for the parameters.

Thus, the UI generated by the UI application 1030 can display information for services, operations, and parameters in a user-friendly and intuitive web form. In this manner, the users are not exposed to the technical aspect of the API specification language and is sufficient to interact with simple and clearly displayed parameters for the API call. For example, the user making the request may not need to enter the parameters in the form of a structured JSON string, since the components of the administration module 370 would automatically parse the schema of the API specification to extract the parameters and the UI application 1030 would render them as simple individual fields on the user interface for the user.

The administration engine 1035 receives the request to perform an administration operation. The request may be received through the UI application 1030. In another instance, the administration engine 1035 may receive a request from a user that is submitted through a command line interface (CLI) without submitting through the UI. The user of the request may specify information about the request, including input values of the parameters, through the CLI. Alternatively, the administration engine 1035 may receive a request that is triggered from a service running on a datacenter.

The administration engine 1035 determines whether the requested operation is approved. In one embodiment, the administration engine 1035 forwards the request to one or more approvers for the administration operation. In one instance, responsive to receiving a request from the administration engine 1035, the UI application 1030 may deploy a user interface that an approver can access to approve or reject the request. The request presented to the approver may include the operator and groups the operator is a member of, name of the service and administration operation, and any other metadata associated with the request. In one instance, the administration engine 1035 performs an authorization check to determine whether the approver is included in the list of approvers for the administration operation as specified by the directory service. For example, the administration engine 1035 may determine whether the approver is an individual or belongs to a group specified on the approver list.

In another instance, the directory service also indicates whether certain users as operators are auto-approved to perform an administration operation. Specifically, the administration engine 1035 performs an authorization check to determine whether the operator is already approved to perform the administration operation. In such an instance, the operation request may be automatically approved without requesting a separate approver for approval.

After the administration operation has been approved, the administration engine 1035 generates an authorization token for the request. The authorization token is cryptographically signed by the administration engine 1035 and is used to validate the request by components of the service datacenter 1020. Cryptographically signing the authorization token can allow the administration agent to determine whether the administration engine or any component of the control datacenter has been tampered with before proceeding to process the request and can be used to determine the integrity of the claims in the authorization token. The authorization token also includes claims that are information pieces inserted in the token about the request. In one instance, the claims include the administration API approved for the request, the operator and approver of the request. In another instance, the claims can include an operator for the request and whether the operator was on an auto-approve list for executing the API. The claims may be hashed and encrypted according to a predetermined protocol. In one instance, the authorization token is in the form of a JSON web token (JWT), but it is appreciated that in other embodiments, the authorization token can be generated using any other method.

Messaging for Administration Engine and Agents

As described above, in one embodiment, the administration engine 1035 communicates with administration agents 1050 of the service datacenters 1020 to distribute operation requests by employing a publish-subscribe ("pub-sub") messaging mechanism. In one embodiment, the message broker 1040 includes an engine request exchange that the administration engine 1035 can use to publish messages to administration agents 1050. The message broker 1040 also includes an agent response exchange that an administration agent 1050 can use to publish messages to the administration engine 1035.

Specifically, with respect to the engine request exchange, the message broker 1040 may include a queue associated with each administration agent 1050 that the administration agent 1050 can use to subscribe to messages published in the engine request exchange. In one embodiment, the queue associated with a respective agent 1050 is named in the format of <service Datacenter Instance>-<Functional Domain Instance> (e.g., one queue is named dev1-uswest2.cdp1, second queue is named test1-uswest2.cdp1, and third queue is named perf2-uswest2.cdp1). Depending on the requested administration operation, the administration engine 1035 publishes a message to the engine request exchange to target administration agents 1050 that can service the request.

Specifically, a message is received by a respective queue if the queue "binds" to a routing key attached to the message.

In one instance, the routing key is formatted as a hierarchical namespace that includes a series of delimited fields that correspond to, for example, the source of the message, action type of the message, and applications and services that target queues should be affiliated with. For example, a queue for an administration agent may be affiliated with a service datacenter, a functional domain within the service datacenter, one or more applications deployed within the functional domain, and one or more services running for the application in a hierarchical manner.

In one instance, the routing key is formatted as <source>.<target>.<type>.<app>, where <source> is the source of the message, <target> is a target entity, <type> is the type of action requested for the message, and <app> is a namespace of the application and service associated with the target queue. Thus, one example of the routing key may be admEngine.agent.job-submit.dev1-uswest2.cdp1.admin-service1, where admEngine refers to the administration engine 1035, job-submit refers to an action type of submitting a job, dev1-uswest2 refers to the target service datacenter and functional domain dev1-uswest2, cdp1 refers to the target application, and admin-service1 refers to the target service instance for the application.

Moreover, a queue receives a message if a binding key matches the routing key attached to the message. The binding key for a queue may specify values for a series of delimited fields similar to the routing key that determine when the incoming message should be placed in the queue. Specifically, a queue binds to a routing key if the values for the set of fields for the queue respectively match the values for the set of fields specified in the routing key. Responsive to binding, the incoming message may be placed in the queue such that an administration agent 1050 associated with the queue can process the request. Thus, depending on the values of the routing key and the binding key, a published message can also be picked up by multiple agents for execution. For instance, a message to execute an API (e.g. findTenant) against a particular functional domain (e.g. TenantStore) will be simultaneously executed by all administration agents servicing the functional domain even if the administration agents each service different service datacenters 1020.

In one instance, the routing key is further configured to specify any value for a field by, for example, using a wildcard symbol such as * in place of an element in the namespace. For example, a routing key admEngine.agent.job-submit.*.cdp1.* may target queues associated with administration agents 1050 that serve any service datacenter 1020 and functional domain that service the cdp1 application. This allows the administration engine 1035 to flexibly target queues that subscribe to different topics, and thus, can also be used to target multiple administration agents 1050.

Thus, for an approved operation request, the administration engine 1035 formulates a message for the request in conjunction with the message broker 1040. In one instance, the message includes an envelope that includes the authorization token (e.g., JWT token) and the routing key added to the message header. In one instance, an operation request may be submitted using the action type job-ready, and the content of the message may include details of the request including the administration API for invocation, input values for parameters, and any other metadata about the request.

With respect to the agent response exchange, the message broker 1040 may also include one or more queues that the administration engine 1035 can use to subscribe to messages published in the agent response exchange. The agent response exchange receives messages published by administration agents 1050 responsive to invoking the API's for the requested administration operation. The messages may include the responses to the invocation.

In one embodiment, multiple instances of administration engines 1035 may publish messages to the same engine request exchange or and subscribe to the same agent response exchange for responses from the administration agents 1050 that handled the requests. In such an embodiment, the administration engine 1035 that submits a particular request may temporarily create a dynamic queue in the message broker 1040 to receive responses for the particular request. In particular, when the administration engine 1035 publishes a message in the engine request exchange, the administration engine 1035 may include a reply field in the content of the message that indicates the routing key an administration agent 1050 will use to route its response. The routing key may be the name of the dynamic queue. In this manner, the administration engine 1035 that submitted the request will receive a response for the particular request through the dynamic queue. The dynamic queen may close once a response is received.

Invocation of Administration API's

The administration agent 1050 processes incoming messages in a queue associated with the administration agent 1050. Specifically, the administration agent 1050 performs a job request specified in the message. In one instance, the administration agent 1050 may authenticate and verify a message to confirm that the source of the message is from an administration engine 1035. In one instance, the job request is a request to perform an administration operation, and the administration agent 1050 retrieves the details of the operation request from the message. The administration agent 1050 forwards the operation request and the authorization token attached to the message to the auxiliary service 1075.

Specifically, the auxiliary service 1075 may gate one or more administration API's deployed in the functional domain 1065 of a service datacenter 1020. The auxiliary service 1075 may be a wrapper around the administration API's 1080 and perform pre-processing or post-processing tasks for administration requests related to the administration API's 1080. In one embodiment, one auxiliary service 1075 is placed in front of a collection of API's associated with a service. In another embodiment, one auxiliary service 1075 is placed in front of a collection of API's associated with multiple services.

Responsive to receiving details of an operation request from the administration agent 1050, the auxiliary service 1075 performs an authorization process to determine whether the operation request is received from an administration agent 1050. The auxiliary service 1075 also performs a validation process to determine whether the authorization token is signed by an administration engine 1035. The authorization process and the validation process allow the auxiliary service 1075 to verify that the API's associated with the operation requests can be invoked safely and that neither of the administration engine 1035 nor the administration agent 1050 is compromised in the process.

The auxiliary service 1075 also retrieves claims from the authorization token that include one or more administration API's approved for the request, and the operator and approver for the request. The auxiliary service 1075 performs an authorization check to determine whether the approver is included in the list of approvers or the operator is included in the list of approved operators by accessing the directory service. Responsive to the determination, the auxiliary service 1075 invokes the administration API 1080 for the operation using the input values of the parameters if any. The auxiliary service 1075 receives the response from the administration API 1080 and forwards the response to the administration agent 1050.

Responsive to receiving the response from the auxiliary service 1075, the administration agent 1050 publishes a message including the response to the agent response exchange. In one instance, when dynamic queues are used for responses, the administration agent 1050 retrieves the routing key from the reply to field in the message of the request and publishes the message including the response using the routing key such that the queue for the particular request binds to the routing key for the message including the response.

The administration engine 1035 receives the response via the dynamic queue and may forward the response to the UI application 1030. The UI application 1030 may display the response back to the user of the request through the user interface.

Audit System

In one embodiment, the administration engine 1035 is also responsible for generating audit information responsive to completing one or more events within the cloud infrastructure. The administration engine 1035 may manage an audit datastore (not shown) to store and manage audit information. The audit datastore may be organized by tenant, application, service, or operations. In one instance, the administration engine 1035 creates an audit trail when a request for an administration operation is submitted by an operator, when an approver has approved the administration operation, when an approver has rejected the administration operation, when an execution has started for an operation, when an operation has been canceled, or when an operation has been completed. The audit trail may include, for example, the user identifier for the user associated with an event, time-stamp of the event, region of the event, and the like.

In one embodiment, responsive to invoking an administration operation, an auxiliary service 1075 provides audit information along with the response to the administration agent 1050. The audit information may include name and parameters of the API, approver, operator, service name and instance, what time the execution started and ended, and whether the execution was a success or failure. The administration agent 1050 may include the audit information in the message published to the agent response exchange, such that the administration engine 1035 can store in the audit datastore.

Configuration of Cloud Infrastructure for Custom Applications

Figure 12:
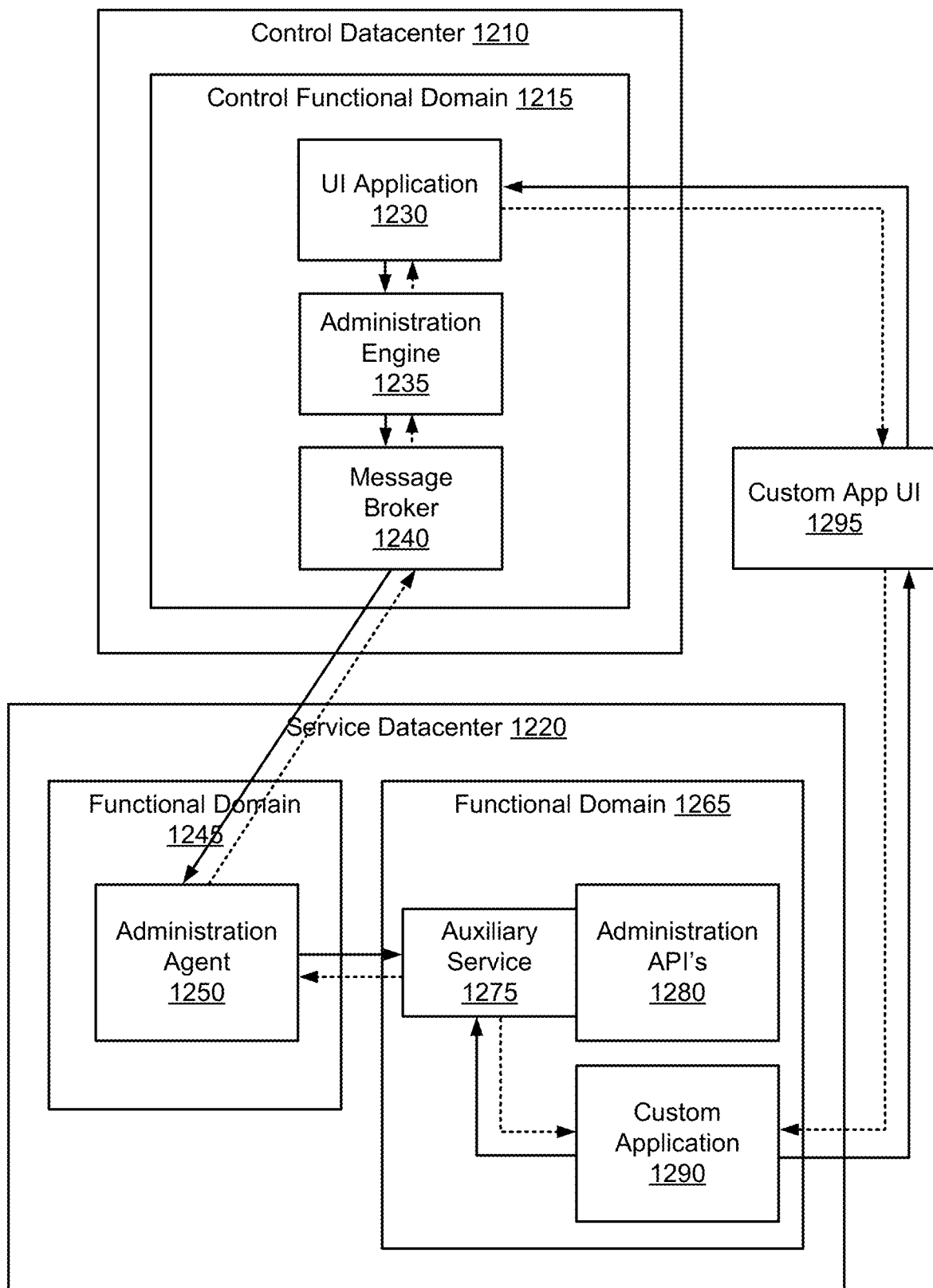
FIG. 12 shows the overall configuration of a cloud infrastructure for managing administration operations for a custom application according to an embodiment.

FIG. 12 shows the overall configuration of a cloud infrastructure for managing administration operations for a custom application according to an embodiment. The cloud infrastructure in FIG. 12 includes components substantially similar or identical to those described in the cloud infrastructure of FIG. 10 and the description thereof will be omitted for the sake of brevity. However, different from the cloud infrastructure of FIG. 10, the cloud infrastructure of FIG. 12 includes a custom application 1290 deployed in the service datacenter 1220 that is coupled to a custom application user interface 1295.

Specifically, in many cases, an entity (e.g., customer support team, infrastructure team) within the multi-tenant system 110 may have a custom workflow built around their administration API's. The custom workflow may be more complex than a single request and response structure and may necessitate a custom application for handling the workflow. In such an instance, an administration operation performed by a custom application may involve multiple API calls that might be iteratively invoked during a task. For example, a group responsible for deploying machine-learning services in the cloud platform 120 may address issues with customer training data by inquiring iteratively into the training data through multiple API calls that might be deployed across different service instances.

However, managing custom workflows may require significant resources and time. For example, the entity associated with the custom application may have to implement various processes (e.g., user authorization, audit, authorization token generation) to ensure that the API invocations are compliant with the policies of the multi-tenant system 110. Moreover, it may be inefficient for a user of the custom application to invoke each of the administration API's in a group operation individually through the UI application 1230 and the administration engine 1235 since, for example, the user may have to wait for multiple approval processes to take place.

Thus, as described in conjunction with the code check-in module 710, an operation owner may define multiple API calls as a group operation. The owner may register the group operation such that the administration API's are deployed within a service datacenter 1220 of the cloud infrastructure. The custom application is integrated with the service datacenter 1220 such that API calls invoked through the custom application 1290 are compliant within the processes and network boundaries set by the cloud infrastructure, while providing a flexible and efficient way to invoke group operations.

Specifically, the custom application 1290 generates a custom application UI 1295 that a user of the custom application can use to initiate a request for performing an administration operation (which may be a group operation). In one instance, the custom application 1290 redirects the user to a user interface generated by the UI application 1230. Similar to the description of FIG. 10, the UI application 1230 generates a page on the client device that allows the user to select among available services and available administration operations within the selected service. In the embodiment in FIG. 12, the user interface generated by the UI application 1230 may display group operations supported by the custom application in addition to other types of administration operations. The user may select a group operation on the list.

Similar to the description of FIG. 10, the administration engine 1235 may determine whether the requested group operation is approved by forwarding the request to one or more approvers and determining whether the approver is on the list of approvers or determining whether the operator of the request is already approved. The administration engine 1235 generates the authorization token responsive to the approval. Specifically, the authorization token may include claims such as the operator and approver of the group operation, and a list of allowed API's for the session.

In one embodiment, the allowed list of administration API's is recorded in the authorization token using a data structure that allows encoding of multiple API's. Specifically, attaching a list of the administration API's allowed for a group operation can significantly increase the number of bits required for the authorization token since there may be many administration API's in the list. Thus, in one embodiment, the administration engine 1235 generates the authorization token using a data structure that allows the list of administration API's to be represented using a smaller number of bits.

In one instance, the data structure is a bloom filter that represents the list of administration API's using one or more hash functions. Specifically, the data structure includes a predetermined number of elements (e.g., 32, 64, 128 bits). An administration API is represented in the bloom filter by applying one or more hash functions to the API (e.g., name of the API). Each hash function maps the API to one element in the data structure and the mapped elements are set to a non-zero value (e.g., value of one).

For example, the bloom filter may include 64 bits. A hash function may be applied to an API by applying the SHA-2 hash to the name of the API and computing the modular 64 of the hash. The first hash function maps the API to the third element of the data structure and the third element is set to a value of one. Thus, the API may be represented in the bloom filter by the third element set to a value of one. Other API's may be represented in a similar manner, and the bloom filter may represent the list of allowed API's for the group operation by mapping each API to a corresponding element in the data structure as a result of applying the hash function.

Responsive to an approved request, the administration engine 1235 redirects the user back to the custom application UI 1295 with the authorization token. The custom application 1290 receives the authorization token and provides the authorization token and details of the operation request to one or more auxiliary services 1275 that are gating the administration API's 1280 for the group operation. Specifically, since a group operation may include multiple API's associated with one or more services, the custom application 1290 in some instances forwards the authorization token and the operation request to multiple auxiliary services 1275 that are each, for example, gating administration API's 1280 for a respective service. In such an instance, each auxiliary service 1275 receives the same authorization token.

Responsive to receiving the authorization token and the operation request, an auxiliary service 1275 may perform an authentication process and a validation process for the authorization token, similar to that described in conjunction with FIG. 10. The auxiliary service 1275 then retrieves claims from the authorization token that include the operator and/or the approver of the group operation. The auxiliary service 1275 performs an authorization check using the directory service to determine whether the approver is included in the list of approvers or the operator is included in the list of approved operators.

The auxiliary service 1275 may also perform an "allow-list" check to determine whether one or more administration API's that the auxiliary service 1275 is responsible for are included in the list of allowed API's in the authorization token. Specifically, the auxiliary service 1275 may retrieve the bloom filter data structure and determine whether the administration API's gated by the auxiliary service 1275 are represented in the list. For example, the auxiliary service 1275 may determine that an administration API is included in the list of allowed API's by applying the first hash function and the second hash function, and determining whether the mapped elements have a value of one. In this manner, the authorization token including a bloom filter provides a space-efficient way of encoding the list of approved API's.

The auxiliary service 1275 invokes the approved API's using details of the request (e.g., parameter values, number of times of invocation) to generate responses. The auxiliary service 1275 provides the responses to the custom application 1290. The custom application 1290 presents the responses to the user of the custom application UI 1295.

Figure 13:
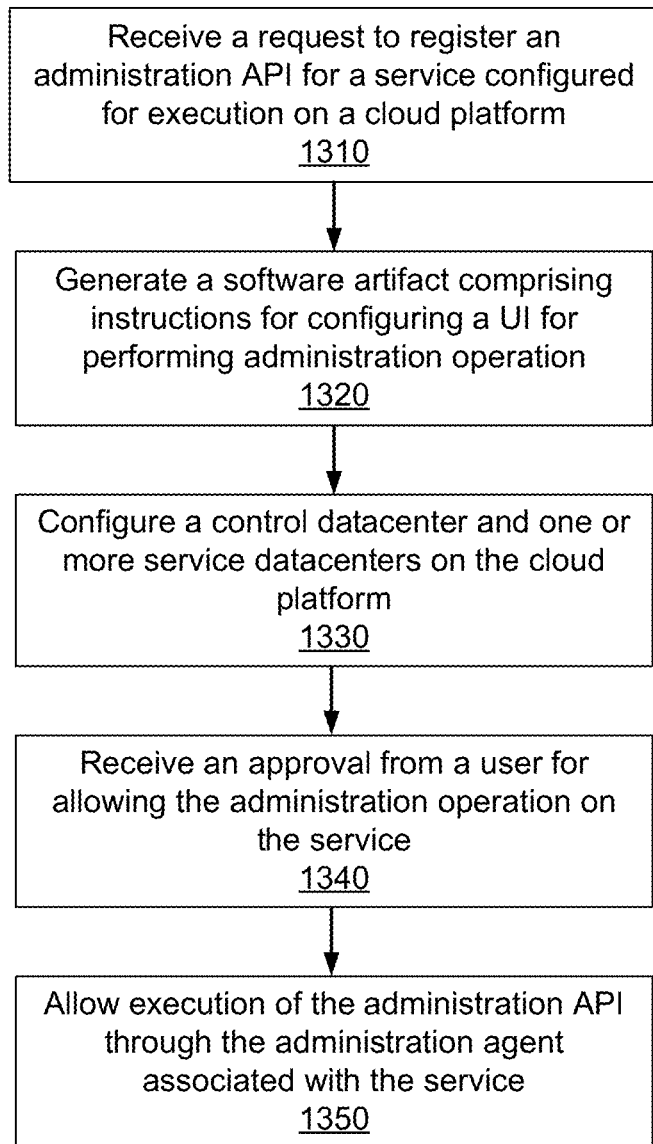
FIG. 13 illustrates a flowchart for a method of executing an administration operation in a cloud platform according to an embodiment.

FIG. 13 illustrates a flowchart for a method of executing an administration operation in a cloud platform according to an embodiment. In one embodiment, the method illustrated in FIG. 13 is performed by various components of the cloud infrastructure described herein.

An administration module receives 1310 a request to register an administration API for a service configured for execution on a cloud platform. The administration API is for performing an administration operation associated with the service. The administration module generates 1320 a software artifact including instructions for configuring a user interface for performing the administration operation based on the administration API. A deployment module configures on 1330 a cloud platform, a control datacenter including an administration engine using the software artifact, and one or more service datacenters, where a service datacenter runs an instance of the service and an administration agent associated with the instance of the service. The administration engine receives 1340 an approval from a user for allowing the administration operation on a particular instance of the service. Responsive to the approval, execution of the administration API is allowed 1350 by the administration agent associated with the particular instance of the service.

Figure 14:
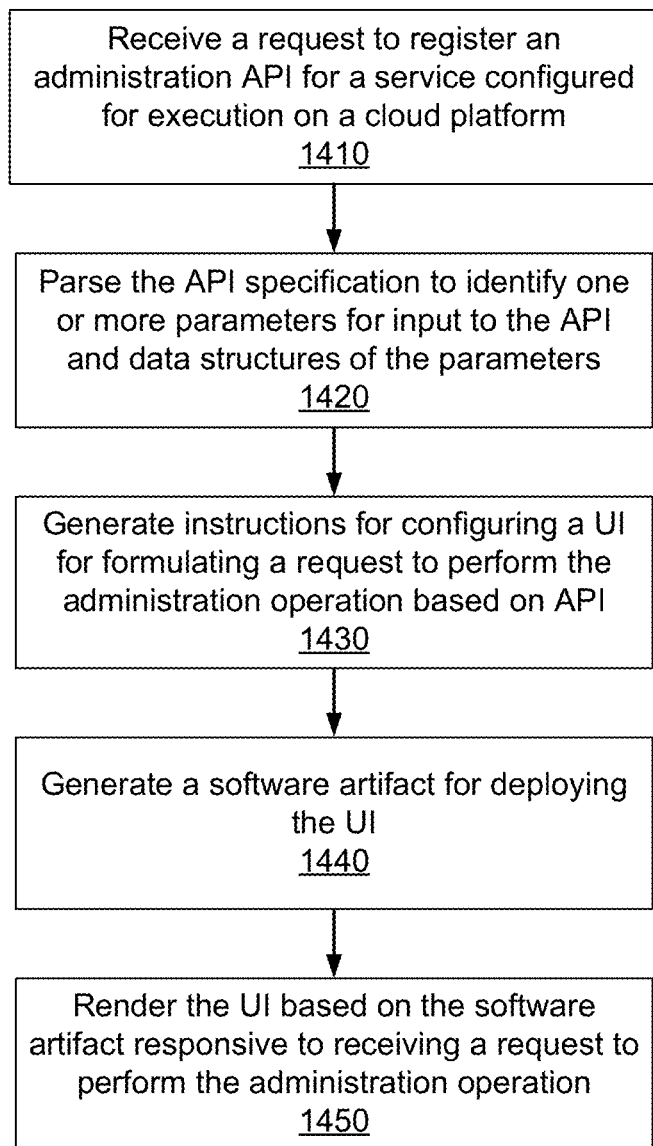
FIG. 14 illustrates a flowchart for a method of generating a user interface for submitting requests to perform administration operations according to an embodiment.

FIG. 14 illustrates a flowchart for a method of generating a user interface for submitting requests to perform administration operations according to an embodiment. In one embodiment, the method illustrated in FIG. 14 is performed by various components of the cloud infrastructure described herein.

An administration module receives 1410 a request to register an API for performing an administration operation configured for execution on a cloud platform. The request includes an API specification describing the API. The administration module parses 1420 parsing the API specification to identify one or more parameters for input to the API and data structures of the one or more parameters. The administration module generates 1430 instructions for configuring a UI for formulating a request to perform the administration operation based on the API. The instructions include one or more UI elements for receiving input values of the one or more parameters. A UI element for a respective parameter is determined based on the data structure for the respective parameter. The administration module generates 1440 a software artifact for deploying the UI. A user interface application renders 1450 the UI based on the software artifact for display on a client device of the user request responsive to receiving a request to perform the administration operation based on the API.

Figure 15:
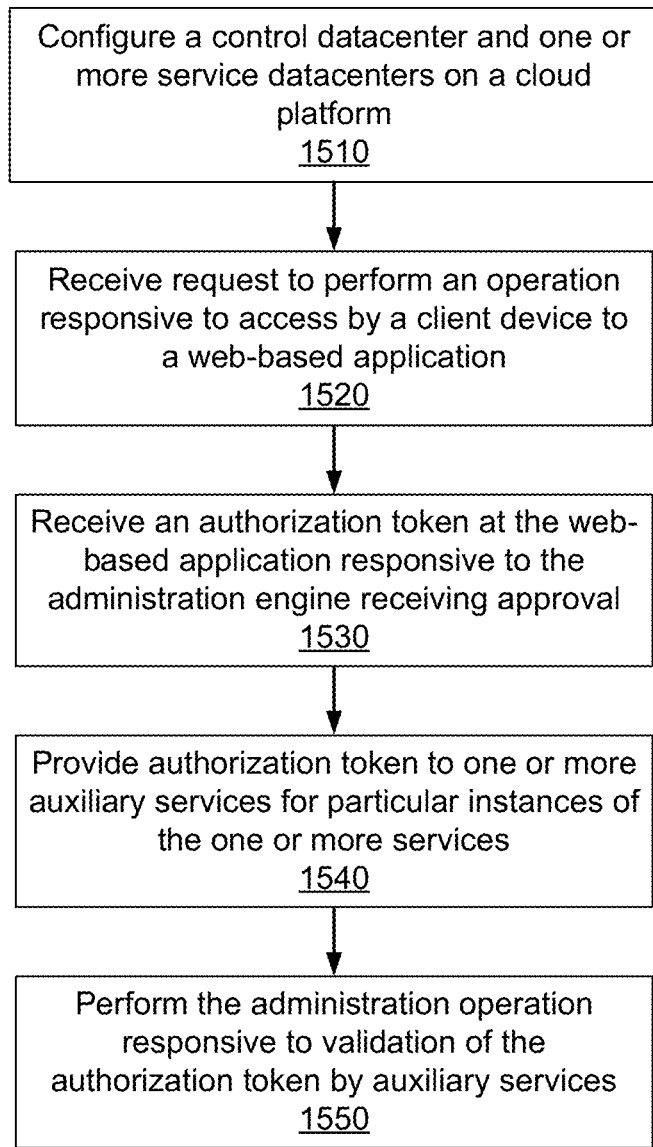
FIG. 15 illustrates a flowchart for a method of performing administration operations using a web-based application according to an embodiment.

FIG. 15 illustrates a flowchart for a method of performing administration operations using a web-based application according to an embodiment. In one embodiment, the method illustrated in FIG. 15 is performed by various components of the cloud infrastructure described herein.

A deployment module configures 1510 on a cloud platform, a control datacenter including an administration engine, and one or more service datacenters. A service datacenter runs instances of at least one service and an auxiliary service associated with API's for at least one service. An administration engine receives 1520 a request to perform an administration operation associated with one or more services by executing a set of administration API's responsive to access by a client device to a web-based application. Responsive to the administration engine receiving an approval for allowing the administration operation, the web-based application receives 1530 an authorization token for performing the administration operation. The custom application provides 1540 the authorization token to one or more auxiliary services for particular instances of the one or more services. The administration operation is performed 1550 responsive to validation of the authorization token by the one or more auxiliary services by executing the set of administration API's.

Figure 16:
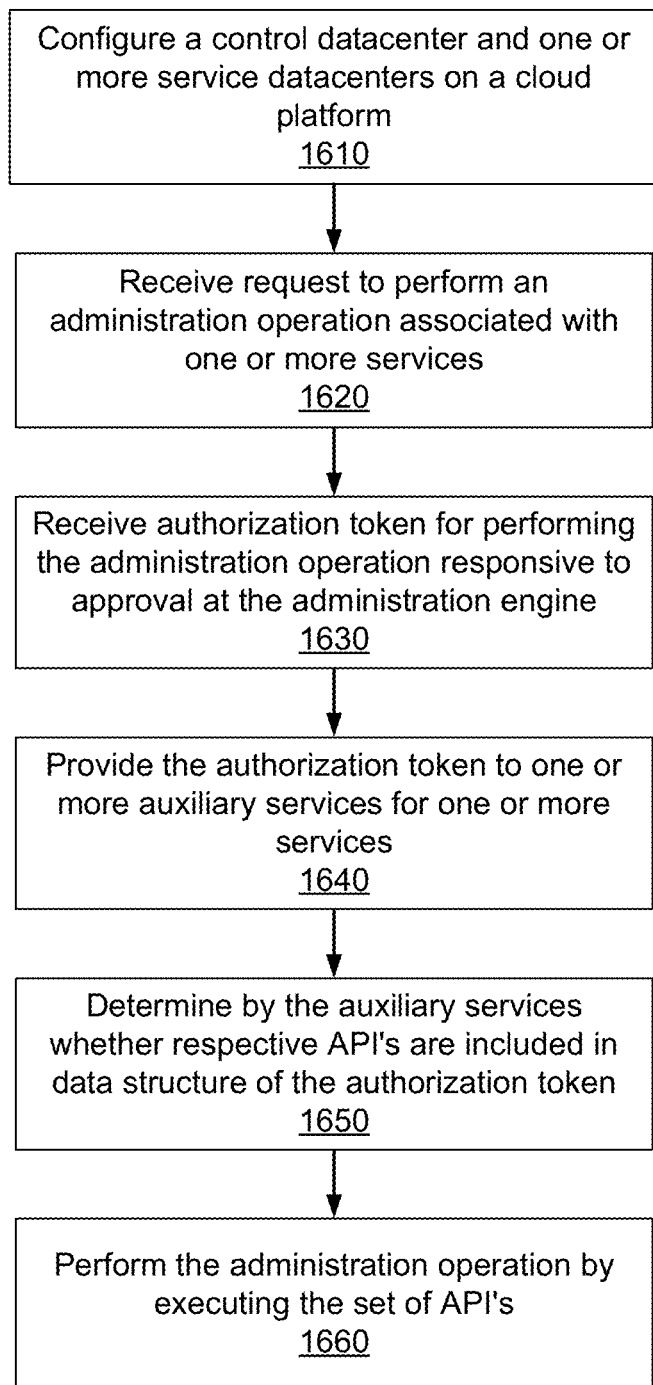
FIG. 16 illustrates a flowchart for a method of performing administration operations using an authorization token including a data structure according to an embodiment.

FIG. 16 illustrates a flowchart for a method of performing administration operations using an authorization token including a data structure according to an embodiment. In one embodiment, the method illustrated in FIG. 16 is performed by various components of the cloud infrastructure described herein.

A deployment module configures 1610 on a cloud platform, a control datacenter including an administration engine, and one or more service datacenters. A service datacenter runs instances of at least one service and an auxiliary service associated with API's for the at least one service. An administration engine receives 1620 a request to perform an administration operation associated with one or more services by executing a set of administration API's. Responsive to the administration engine receiving an approval for allowing the administration operation, the web-based application receives 1630 an authorization token for performing the administration operation. The authorization token encodes at least in part a data structure representing the set of administration API's using a hash function. The custom application provides 1640 the authorization token to one or more auxiliary services for particular instances of the one or more services. The one or more auxiliary services determine 1650 whether respective administration API's associated with the one or more auxiliary services are included in the data structure encoded by the authorization token. The administration operation is performed 1660 by executing the set of administration API's responsive to the determination.

Computer Architecture

Figure 17:
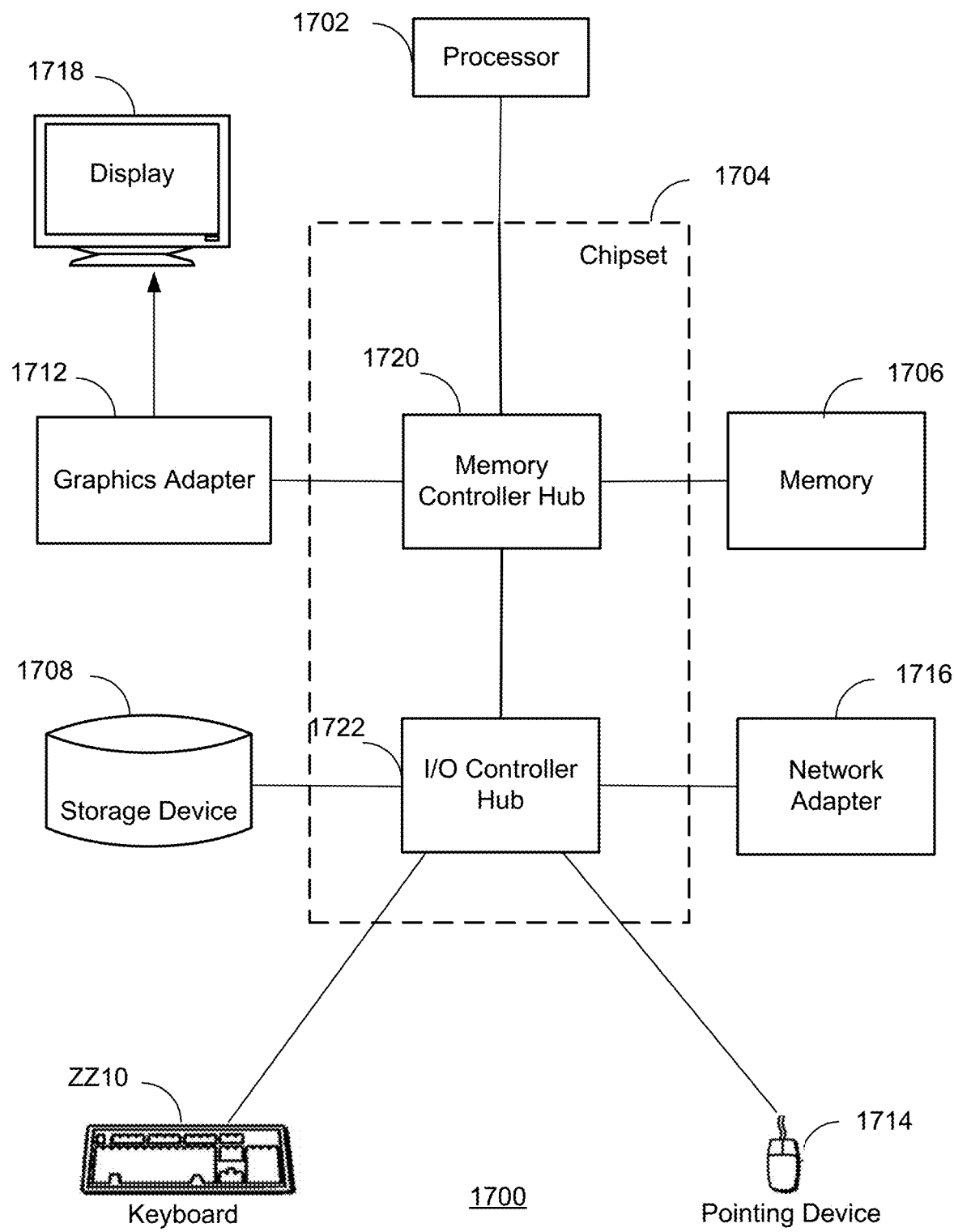
FIG. 17 is a block diagram illustrating a functional view of a typical computer system for use in the environment of FIG. 1 according to one embodiment.

FIG. 17 is a high-level block diagram illustrating a functional view of a typical computer system for use as one of the entities illustrated in the environment 100 of FIG. 1 according to an embodiment. Illustrated are at least one processor 1702 coupled to a chipset 1704. Also coupled to the chipset 1704 are a memory 1706, a storage device 1708, a keyboard 1710, a graphics adapter 1712, a pointing device 1714, and a network adapter 1716. A display 1718 is coupled to the graphics adapter 1712. In one embodiment, the functionality of the chipset 1704 is provided by a memory controller hub 1720 and an I/O controller hub 1722. In another embodiment, the memory 1706 is coupled directly to the processor 1702 instead of the chipset 1704.

The storage device 1708 is a non-transitory computer-readable storage medium, such as a hard drive, compact disk read-only memory (CD-ROM), DVD, or a solid-state memory device. The memory 1706 holds instructions and data used by the processor 1702. The pointing device 1714 may be a mouse, track ball, or other type of pointing device, and is used in combination with the keyboard 1710 to input data into the computer system 1700. The graphics adapter 1712 displays images and other information on the display 1718. The network adapter 1716 couples the computer system 1700 to a network.

As is known in the art, a computer 1700 can have different and/or other components than those shown in FIG. 17. In addition, the computer 1700 can lack certain illustrated components. For example, a computer system 1700 acting as a multi-tenant system 110 may lack a keyboard 1710 and a pointing device 1714. Moreover, the storage device 1708 can be local and/or remote from the computer 1700 (such as embodied within a storage area network (SAN)).

The computer 1700 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1708, loaded into the memory 1706, and executed by the processor 1702.

The types of computer systems 1700 used by the entities of a system environment can vary depending upon the embodiment and the processing power used by the entity. For example, a client device may be a mobile phone with limited processing power, a small display 1718, and may lack a pointing device 1714. A multi-tenant system or a cloud platform, in contrast, may comprise multiple blade servers working together to provide the functionality described herein.

ADDITIONAL CONSIDERATIONS

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet. Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

What is claimed is:

1. A computer implemented method for administration of services in a cloud platform, the method comprising:
    receiving a request to register an administration application programming interface (API) for a service configured for execution on a cloud platform, the administration API for performing an administration operation associated with the service;
    generating a software artifact comprising instructions for configuring a user interface for performing the administration operation based on the administration API;
    configuring on the cloud platform:
        a control datacenter including an administration engine using the software artifact; and
        one or more service datacenters, wherein a service datacenter runs an instance of the service and an administration agent associated with the instance of the service;
    receiving by the administration engine, an approval from a user for allowing the administration operation on a particular instance of the service; and
    responsive to the approval, allowing by the administration agent associated with the particular instance of the service, execution of the administration API for the particular instance of the service.

2. The computer implemented method of claim 1, further configuring on the cloud platform a message broker including a first exchange and a first message queue for the administration agent configured to subscribe to messages from the first exchange.

3. The computer implemented method of claim 2, the method further comprising:
    publishing, by the administration engine, a message requesting execution of the administration API to the first exchange, wherein the message is attached with a routing key specifying at least a service datacenter, an application, or a service associated with one or more target administration agents.

4. The computer implemented method of claim 3, wherein the first message queue for the administration agent is associated with a binding key, and responsive to determining that the binding key matches the routing key, placing the message in the first message queue for processing by the administration agent.

5. The computer implemented method of claim 2, wherein the message broker further includes a second exchange and a second message queue for the administration engine configured to subscribe to messages from the second exchange.

6. The computer implemented method of claim 5, the method further comprising:
    publishing, by the administration agent, a message including a response to the execution to the second exchange.

7. The computer implemented method of claim 6, wherein the second message queue is a dynamic queue created for receiving a response to execution of the administration API, and the message is attached with a routing key that is a name of the dynamic queue.

8. The computer implemented method of claim 1, further comprising:
    receiving a declarative specification for configuring datacenters on a cloud platform, the declarative specification describing:
        the control datacenter including an administration engine using the software artifact; and
        one or more service datacenters, wherein a service datacenter runs an instance of the service and an administration agent associated with the instance of the service; and
    wherein configuring on the cloud platform is performed using the declarative specification.

9. The computer implemented method of claim 1, wherein the control datacenter executes in a first geographical location and the service datacenter executes in a second geographical location, wherein the first geographical location and the second geographical location are distinct.

10. The computer implemented method of claim 1, wherein the control datacenter executes in a first cloud platform and the service datacenter executes in a second cloud platform.

11. The computer implemented method of claim 1, further comprising:
    receiving a cloud platform independent declarative specification; and
    compiling the cloud platform independent declarative specification to generate a cloud platform specific datacenter representation.

12. The computer implemented method of claim 11, wherein compiling the cloud platform independent declarative specification comprises:

generating a first version of a cloud platform independent detailed metadata representation of the control datacenter from an original declarative specification; and generating a second version of the cloud platform independent detailed metadata representation of the control datacenter from a modified declarative specification.

13. The computer implemented method of claim 12, further comprising:

generating a platform specific detailed metadata representation for the cloud platform based on the first version of the cloud platform independent detailed metadata representation; and deploying the control datacenter on the cloud platform based on the platform specific detailed metadata representation.

14. The computer implemented method of claim 11, wherein the cloud platform independent declarative specification comprises definitions of one or more datacenter instances, each datacenter instance including one or more service groups, wherein each service group comprises a set of services.

15. A non-transitory computer readable storage medium for storing instructions that when executed by a computer processor cause the computer processor to perform steps for:

receiving a request to register an administration application programming interface (API) for a service configured for execution on a cloud platform, the administration API for performing an administration operation associated with the service;

generating a software artifact comprising instructions for configuring a user interface for performing the administration operation based on the administration API;

configuring on the cloud platform:
a control datacenter including an administration engine using the software artifact; and
one or more service datacenters, wherein a service datacenter runs an instance of the service and an administration agent associated with the instance of the service;

receiving by the administration engine, an approval from a user for allowing the administration operation on a particular instance of the service; and responsive to the approval, allowing by the administration agent associated with the particular instance of the service, execution of the administration API for the particular instance of the service.

16. The non-transitory computer readable storage medium of claim 15, the steps further configuring on the cloud platform a message broker including a first exchange and a first message queue for the administration agent configured to subscribe to messages from the first exchange.

17. The non-transitory computer readable storage medium of claim 16, the steps further comprising:

publishing, by the administration engine, a message requesting execution of the administration API to the first exchange, wherein the message is attached with a routing key specifying at least a service datacenter, an application, or a service associated with one or more target administration agents.

18. The non-transitory computer readable storage medium of claim 17, wherein the first message queue for the administration agent is associated with a binding key, and responsive to determining that the binding key matches the routing key, placing the message in the first message queue for processing by the administration agent.

19. The non-transitory computer readable storage medium of claim 16, wherein the message broker further includes a second exchange and a second message queue for the administration engine configured to subscribe to messages from the second exchange.

20. The non-transitory computer readable storage medium of claim 19, the steps further comprising:

publishing, by the administration agent, a message including a response to the execution to the second exchange.

21. The non-transitory computer readable storage medium of claim 20, wherein the second message queue is a dynamic queue created for receiving a response to execution of the administration API, and the message is attached with a routing key that is a name of the dynamic queue.

22. The non-transitory computer readable storage medium of claim 15, the steps further comprising:

receiving a declarative specification for configuring datacenters on a cloud platform, the declarative specification describing:
the control datacenter including an administration engine using the software artifact; and
one or more service datacenters, wherein a service datacenter runs an instance of the service and an administration agent associated with the instance of the service; and wherein configuring on the cloud platform is performed using the declarative specification.

23. The non-transitory computer readable storage medium of claim 15, wherein the control datacenter executes in a first geographical location and the service datacenter executes in a second geographical location, wherein the first geographical location and the second geographical location are distinct.

24. The non-transitory computer readable storage medium of claim 15, wherein the control datacenter executes in a first cloud platform and the service datacenter executes in a second cloud platform.

25. The non-transitory computer readable storage medium of claim 15, the steps further comprising:

receiving a cloud platform independent declarative specification; and compiling the cloud platform independent declarative specification to generate a cloud platform specific datacenter representation.

26. The non-transitory computer readable storage medium claim 25, wherein compiling the cloud platform independent declarative specification comprises:

generating a first version of a cloud platform independent detailed metadata representation of the control datacenter from an original declarative specification; and generating a second version of the cloud platform independent detailed metadata representation of the control datacenter from a modified declarative specification.

27. The non-transitory computer readable storage medium claim 26, the steps further comprising:

generating a platform specific detailed metadata representation for the cloud platform based on the first version of the cloud platform independent detailed metadata representation; and deploying the control datacenter on the cloud platform based on the platform specific detailed metadata representation.

28. The non-transitory computer readable storage medium of claim 27, wherein the cloud platform independent declarative specification comprises definitions of one or more datacenter instances, each datacenter instance including one or more service groups, wherein each service group comprises a set of services.

* * * * *

UNITED STATES PATENT AND TRADEMARK OFFICE
CERTIFICATE OF CORRECTION

PATENT NO. : 11,463,544 B1
APPLICATION NO. : 17/537240
DATED : October 4, 2022
INVENTOR(S) : Peddada et al.

It is certified that error appears in the above-identified patent and that said Letters Patent is hereby corrected as shown below:

In the Claims

In Column 42, in Claim 6, Line 30, delete "execution to" and insert -- execution of --, therefor.

In Column 44, in Claim 20, Line 7, delete "execution to" and insert -- execution of --, therefor.

In Column 44, in Claim 26, Line 43, delete "medium" and insert -- medium of --, therefor.

In Column 44, in Claim 27, Line 52, delete "medium" and insert -- medium of --, therefor.

Signed and Sealed this
Fifth Day of September, 2023

Katherine Kelly Vidal
*Director of the United States Patent and Trademark Office*